US012718287B1

(12) United States Patent
Thornicroft et al.

(10) Patent No.: US 12,718,287 B1
(45) **Date of Patent: *Aug. 25, 2026**

(54) SYSTEMS AND METHODS FOR IMPROVING ONLINE TRANSACTION TECHNOLOGY

(71) Applicant: Lease Bandit Inc., Austin, TX (US)

(72) Inventors: Dayne Alexander Thornicroft, Spicewood, TX (US); Rammy Joudeh, Wyckoff, NJ (US); Sergey Vayser, Kyiv (UA)

(73) Assignee: Lease Bandit Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/969,513

(22) Filed: Dec. 5, 2024

Related U.S. Application Data

(63) Continuation of application No. 17/569,313, filed on Jan. 5, 2022, now Pat. No. 12,190,371.

(60) Provisional application No. 63/134,035, filed on Jan. 5, 2021.

(51) Int. Cl.

| | |
|---|---|
| ***G06Q 30/00*** | (2023.01) |
| ***G06Q 30/0601*** | (2023.01) |
| ***G06Q 30/08*** | (2012.01) |

(52) U.S. Cl.
CPC ......... *G06Q 30/08* (2013.01); *G06Q 30/0641* (2013.01)

(58) Field of Classification Search
CPC ...................................................... G06Q 30/08
See application file for complete search history.

(56) References Cited

U.S. PATENT DOCUMENTS

| | | | |
|---|---|---|---|
| 7,315,832 | B2 | 1/2008 | Bauer et al. |
| 7,634,339 | B2 | 12/2009 | Kudo |
| 2005/0080712 | A1 | 4/2005 | Bauer et al. |
| 2013/0018752 | A1 | 1/2013 | Foster |
| 2019/0172128 | A1 | 6/2019 | Fisher |

OTHER PUBLICATIONS

Johnson, Justin P., and Michael Waldman. "Leasing, lemons, and buybacks." RAND Journal of Economics (2003): 247-265.*
Johnson, et al., "Leasing, lemons, and buybacks", RAND Journal of Economics, 2003, pp. 247-265.

* cited by examiner

*Primary Examiner* — Kathleen Palavecino
(74) *Attorney, Agent, or Firm* — GTC Law Group PC & Affiliates

(57) ABSTRACT

An online transaction platform includes a computer system and a consumer profile database including a first and second consumer profile. The computer system is configured to access the consumer profile database including the first consumer profile and the second consumer profile; determine a first minimum bid for a leasehold transaction based on a seller proceeds value and the first consumer profile associated with a first consumer; determine a second minimum bid for the leasehold transaction based on the seller proceeds value and the second consumer profile associated with a second consumer; cause to be displayed a first visual representation of the leasehold transaction including the first minimum bid; and cause to be displayed a second visual representation of the leasehold transaction including the second minimum bid. The first minimum bid is greater than the second minimum bid, and the seller proceeds value is the same for both the bids.

12 Claims, 18 Drawing Sheets

310
EXTERNAL DEVICE
300
304
I/O
302
PROCESSING DEVICE
306
MEMORY
306
MEMORY

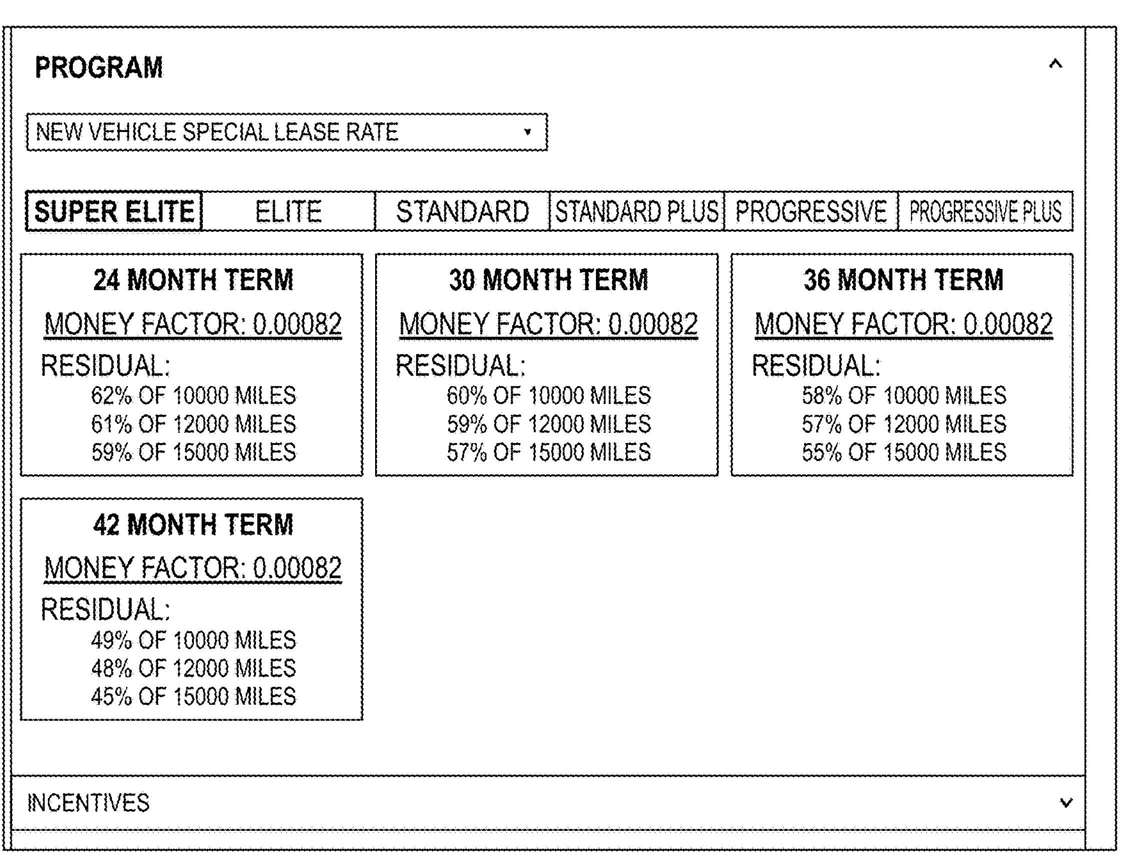

*FIG. 12*

INCENTIVES

US MILITARY APPRECIATION- FS LEASE/ OWNERS CHOICE
ENUS US MILITARY APPRECIATION-FS LEASE/ OWNER CHOICE
$500 CASH

US MILITARY APPRECIATION- FS RETAIL FINACE/ SELECT
ENUS US MILITARY APPRECIATION- FS RETAIL FINACE/ SELECT
$500 CASH

COLLEGE GRADUATE CASH
ENUS US COLLEGE GRADUATE CASH
$1000 CASH

MILITARY APPRECIATION- CASH/ NON FS FUNDED
ENUS US MILITARY APPRECIATION- CASH/ NON FS FUNDED
$3250 CASH

LOYALTY LEASE CREDIT- FS LEASE/ OWNERS CHOICE
ENUS US LOYALTY LEASE CREDIT- FS LEASE/ OWNERS CHOICE
$2000 CASH

CONQUEST LEASE/ APR CREDIT
ENUS US CONQUEST LEASE/ APR CREDIT
$1000 CASH

LEASE CREDIT- FS LEASE/ OWNERS CHOICE
ENUS US LEASE CREDIT- FS LEASE/ OWNERS CHOICE
$500 CASH

APR LOYALTY CREDIT- FS RETAIL FINACE/ SELECT
ENUS US APR LOYALTY CREDIT- FS RETAIL FINACE/ SELECT
$2000 CASH

APR CREDIT- FS RETAIL FINANCE/ SELECT
ENUS US APR CREDIT- FS RETAIL FINANCE/ SELECT
$4500 CASH

*FIG. 13*

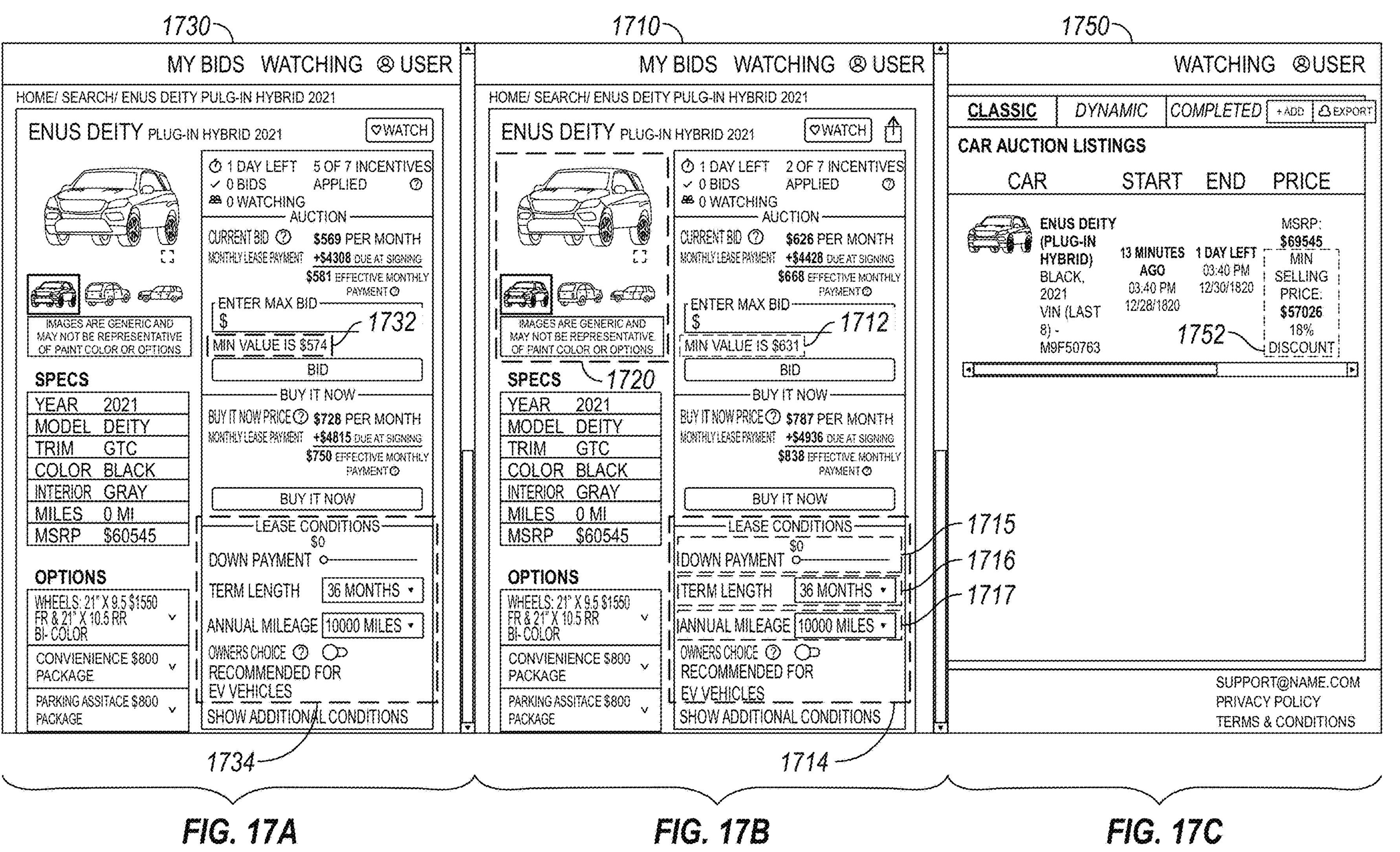
1730
MY BIDS WATCHING USER
HOME/ SEARCH/ ENUS DEITY PULG-IN HYBRID 2021
ENUS DEITY PLUG-IN HYBRID 2021
WATCH
IMAGES ARE GENERIC AND MAY NOT BE REPRESENTATIVE OF PAINT COLOR OR OPTIONS
SPECS
YEAR 2021
MODEL DEITY
TRIM GTC
COLOR BLACK
INTERIOR GRAY
MILES 0 MI
MSRP $60545
OPTIONS
WHEELS: 21" X 9.5 $1550 FR & 21" X 10.5 RR BI-COLOR
CONVIENIENCE $800 PACKAGE
PARKING ASSITACE $800 PACKAGE
1 DAY LEFT
0 BIDS
0 WATCHING
5 OF 7 INCENTIVES APPLIED
AUCTION
CURRENT BID
MONTHLY LEASE PAYMENT
$569 PER MONTH
+$4308 DUE AT SIGNING
$581 EFFECTIVE MONTHLY PAYMENT
ENTER MAX BID
$
1732
MIN VALUE IS $574
BID
BUY IT NOW
BUY IT NOW PRICE
MONTHLY LEASE PAYMENT
$728 PER MONTH
+$4815 DUE AT SIGNING
$750 EFFECTIVE MONTHLY PAYMENT
BUY IT NOW
LEASE CONDITIONS
$0
DOWN PAYMENT
TERM LENGTH
36 MONTHS
ANNUAL MILEAGE
10000 MILES
OWNERS CHOICE
RECOMMENDED FOR EV VEHICLES
SHOW ADDITIONAL CONDITIONS
1734
FIG. 17A
1710
MY BIDS WATCHING USER
HOME/ SEARCH/ ENUS DEITY PULG-IN HYBRID 2021
ENUS DEITY PLUG-IN HYBRID 2021
WATCH
IMAGES ARE GENERIC AND MAY NOT BE REPRESENTATIVE OF PAINT COLOR OR OPTIONS
1720
SPECS
YEAR 2021
MODEL DEITY
TRIM GTC
COLOR BLACK
INTERIOR GRAY
MILES 0 MI
MSRP $60545
OPTIONS
WHEELS: 21" X 9.5 $1550 FR & 21" X 10.5 RR BI-COLOR
CONVIENIENCE $800 PACKAGE
PARKING ASSITACE $800 PACKAGE
1 DAY LEFT
0 BIDS
0 WATCHING
2 OF 7 INCENTIVES APPLIED
AUCTION
CURRENT BID
MONTHLY LEASE PAYMENT
$626 PER MONTH
+$4428 DUE AT SIGNING
$668 EFFECTIVE MONTHLY PAYMENT
ENTER MAX BID
$
1712
MIN VALUE IS $631
BID
BUY IT NOW
BUY IT NOW PRICE
MONTHLY LEASE PAYMENT
$787 PER MONTH
+$4936 DUE AT SIGNING
$838 EFFECTIVE MONTHLY PAYMENT
BUY IT NOW
LEASE CONDITIONS
$0
DOWN PAYMENT
TERM LENGTH
36 MONTHS
ANNUAL MILEAGE
10000 MILES
OWNERS CHOICE
RECOMMENDED FOR EV VEHICLES
SHOW ADDITIONAL CONDITIONS
1715
1716
1717
1714
FIG. 17B
1750
WATCHING USER
CLASSIC
DYNAMIC
COMPLETED
+ADD
EXPORT
CAR AUCTION LISTINGS
CAR
START
END
PRICE
ENUS DEITY (PLUG-IN HYBRID)
BLACK, 2021
VIN (LAST 8) - M9F50763
13 MINUTES AGO
03:40 PM
12/28/1820
1 DAY LEFT
03:40 PM
12/30/1820
MSRP: $69545
MIN SELLING PRICE: $57026
18% DISCOUNT
1752
SUPPORT@NAME.COM
PRIVACY POLICY
TERMS & CONDITIONS
FIG. 17C

SYSTEMS AND METHODS FOR IMPROVING ONLINE TRANSACTION TECHNOLOGY

CROSS-REFERENCE TO RELATED APPLICATIONS

This application is a continuation of U.S. patent application Ser. No. 17/569,313 filed Jan. 5, 2022, and entitled "SYSTEMS AND METHODS FOR IMPROVING ONLINE TRANSACTION TECHNOLOGY."

U.S. patent application Ser. No. 17/569,313 claims the benefit of priority to U.S. Provisional Application No. 63/134,035, filed on Jan. 5, 2021, entitled "TRANSACTION PLATFORM WITH DYNAMIC PRICING."

The foregoing applications are each incorporated herein by reference in their entirety.

BACKGROUND

The present disclosure relates generally to a transaction platform. Online transaction platforms allow sellers to offer their products to a wider audience of consumers while allowing consumers to purchase products from a larger array of sellers. For example, in an online auction site, consumers submit bids on a product until the highest bid is received and the consumer submitting the highest bid is declared the winner. Existing online transaction platforms suffer from a number of shortcomings and disadvantages. For certain types of purchases, terms and conditions of the sale may differ from consumer to consumer. For example, sellers, manufacturers, providers of financing, governmental entities and the like may offer purchase discounts to some, but not all consumers. Based on the purchase discounts available to each consumer, a seller may profit more from selling a product to one consumer, even if another consumer is willing to pay more for the same product. In view of these and other shortcomings in the art, there is a significant need for the apparatuses, methods, systems and techniques disclosed herein.

SUMMARY

Exemplary embodiments of the disclosure include systems, methods, techniques and apparatuses for a transaction platform are disclosed herein. Further embodiments, forms, objects, features, advantages, aspects and benefits of the disclosure shall become apparent from the following description and drawings.

In an aspect, a method for operating on an online leasehold transaction platform comprises accessing a consumer profile database including a first consumer profile associated with a first consumer and a second consumer profile associated with a second consumer; determining a first minimum bid for a leasehold transaction based on a seller proceeds value and the first consumer profile associated with the first consumer; determining a second minimum bid for the leasehold transaction based on the seller proceeds value and the second consumer profile associated with the second consumer; displaying, using a first user interface, a first visual representation of the leasehold transaction including the first minimum bid; and displaying, using a second user interface, a second visual representation of the leasehold transaction including the second minimum bid, wherein the first minimum bid is greater than the second minimum bid, and wherein the seller proceeds value is the same for both the first minimum bid and the second minimum bid.

A further embodiment of any of the foregoing embodiments of the present disclosure may include the first minimum bid corresponding to a monthly payment amount, and wherein the first visual representation of the leasehold transaction includes a plurality of transaction terms.

A further embodiment of any of the foregoing embodiments of the present disclosure may include the plurality of transaction terms including at least one of: a lease term length, a down payment amount, or a mileage amount.

A further embodiment of any of the foregoing embodiments of the present disclosure may include receiving, using the first user interface, at least one of an updated lease term, an updated down payment amount, or an updated mileage amount; and updating the first minimum bid in response to receiving the at least one of the updated lease term, the updated down payment amount, or the updated mileage amount.

A further embodiment of any of the foregoing embodiments of the present disclosure may include the second visual representation of the leasehold transaction including a second plurality of transaction terms, wherein the second plurality of transaction terms is different from the first plurality of transaction terms.

A further embodiment of any of the foregoing embodiments of the present disclosure may include receiving, using the second user interface, a consumer bid greater than or equal to the second minimum bid and less than the first minimum bid; updating the seller proceeds value in response to receiving the consumer bid; and increasing the first minimum bid in response to updating the seller proceeds value.

A further embodiment of any of the foregoing embodiments of the present disclosure may include displaying the first minimum bid using the first user interface occurring simultaneously with displaying the second minimum bid using the second user interface.

A further embodiment of any of the foregoing embodiments of the present disclosure may include the second consumer profile including a leasehold discount, wherein the determining the second minimum bid for the leasehold transaction is further based on the leasehold discount.

A further embodiment of any of the foregoing embodiments of the present disclosure may include displaying, using a seller interface, a third visual representation of the leasehold transaction including the seller proceeds value; and updating the seller proceeds value in response to receiving a consumer bid from the second user interface, wherein the updated seller proceeds value is not equal to the consumer bid, and the seller proceeds value is not equal to the second minimum bid.

A further embodiment of any of the foregoing embodiments of the present disclosure may include the seller proceeds value corresponding to a proceeds amount to be generated whether the leasehold transaction is executed using the first minimum bid or the second minimum bid.

A further embodiment of any of the foregoing embodiments of the present disclosure may include the seller proceeds value corresponding to a discount amount whether the leasehold transaction is executed using the first minimum bid or the second minimum bid.

A further embodiment of any of the foregoing embodiments of the present disclosure may include receiving a consumer bid using the first user interface; updating the seller proceeds value in response to receiving the consumer bid; determining an updated financial parameter in response to the updated seller proceeds value and the second consumer profile; and updating the second minimum bid based on the updated financial parameter.

In another aspect, an online transaction platform comprises a consumer profile database including a first consumer profile and a second consumer profile; and a computer system configured to: access the consumer profile database including the first consumer profile and the second consumer profile; determine a first minimum bid for a leasehold transaction based on a seller proceeds value and the first consumer profile associated with a first consumer; determine a second minimum bid for the leasehold transaction based on the seller proceeds value and the second consumer profile associated with a second consumer; cause to be displayed, on a first user interface, a first visual representation of the leasehold transaction including the first minimum bid; and cause to be displayed, on a second user interface, a second visual representation of the leasehold transaction including the second minimum bid, wherein the first minimum bid is greater than the second minimum bid, and wherein the seller proceeds value is the same for both the first minimum bid and the second minimum bid.

A further embodiment of any of the foregoing embodiments of the present disclosure may include the first minimum bid corresponding to a monthly payment amount, and wherein the first visual representation of the leasehold transaction includes a plurality of transaction terms.

A further embodiment of any of the foregoing embodiments of the present disclosure may include the plurality of transaction terms including at least one of: a lease term length, a down payment amount, or a mileage amount.

A further embodiment of any of the foregoing embodiments of the present disclosure may include the computer system further configured to: receive, using the first user interface, at least one of an updated lease term, an updated down payment amount, or an updated mileage amount; and update the first minimum bid in response to receiving the at least one of the updated lease term, the updated down payment amount, or the updated mileage amount.

A further embodiment of any of the foregoing embodiments of the present disclosure may include the second visual representation of the leasehold transaction including a second plurality of transaction terms, wherein the second plurality of transaction terms is different from the first plurality of transaction terms.

A further embodiment of any of the foregoing embodiments of the present disclosure may include the computer system further configured to: receive, using the second user interface, a consumer bid greater than or equal to the second minimum bid and less than the first minimum bid; update the seller proceeds value in response to receiving the consumer bid; and increase the first minimum bid in response to updating the seller proceeds value.

A further embodiment of any of the foregoing embodiments of the present disclosure may include the computer system further configured to cause the first minimum bid to be displayed on the first user interface simultaneously with the second minimum bid to be displayed on the second user interface.

A further embodiment of any of the foregoing embodiments of the present disclosure may include the second consumer profile including a leasehold discount, and wherein the computer system is further configured to determine the second minimum bid for the leasehold transaction based on the leasehold discount.

A further embodiment of any of the foregoing embodiments of the present disclosure may include the computer system further configured to: cause to be displayed, on a seller interface, a third visual representation of the leasehold transaction including the seller proceeds value; and update the seller proceeds value in response to receiving a consumer bid from the second user interface, wherein the updated seller proceeds value is not equal to the consumer bid, and the seller proceeds value is not equal to the second minimum bid.

A further embodiment of any of the foregoing embodiments of the present disclosure may include the seller proceeds value corresponding to a proceeds amount to be generated whether the leasehold transaction is executed using the first minimum bid or the second minimum bid.

A further embodiment of any of the foregoing embodiments of the present disclosure may include the seller proceeds value corresponding to a discount amount whether the leasehold transaction is executed using the first minimum bid or the second minimum bid.

A further embodiment of any of the foregoing embodiments of the present disclosure may include the computer system further configured to: receive a consumer bid using the first user interface; update the seller proceeds value in response to receiving the consumer bid; determine an updated financial parameter in response to the updated seller proceeds value and the second consumer profile; and update the second minimum bid based on the updated financial parameter.

A further embodiment of any of the foregoing embodiments of the present disclosure may include the computer system including a first computing device having the first user interface, and a second computing device having the second user interface; and the consumer profile database being included in a cloud server.

A further embodiment of any of the foregoing embodiments of the present disclosure may include a cache, wherein the computer system is further configured to access a third-party database using an application programming interface (API) to obtain inventory data for the leasehold transaction; store the inventory data for the leasehold transaction in the cache; and include the inventory data for the leasehold transaction retrieved from the cache as part of the first visual representation of the leasehold transaction and the second visual representation of the leasehold transaction.

These and other systems, methods, objects, features, and advantages of the present inventions will be apparent to those skilled in the art from the following detailed description of the many embodiments and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE DRAWINGS

The disclosure and the following detailed description of certain embodiments thereof may be understood by reference to the following figures:

FIGS. 11-13 illustrate an exemplary listing page displayed on a dealer user interface.

FIGS. 17A-17C illustrates an auction displayed on two consumer user interfaces and a dealer user interface.

DETAILED DESCRIPTION

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Figure 1A:
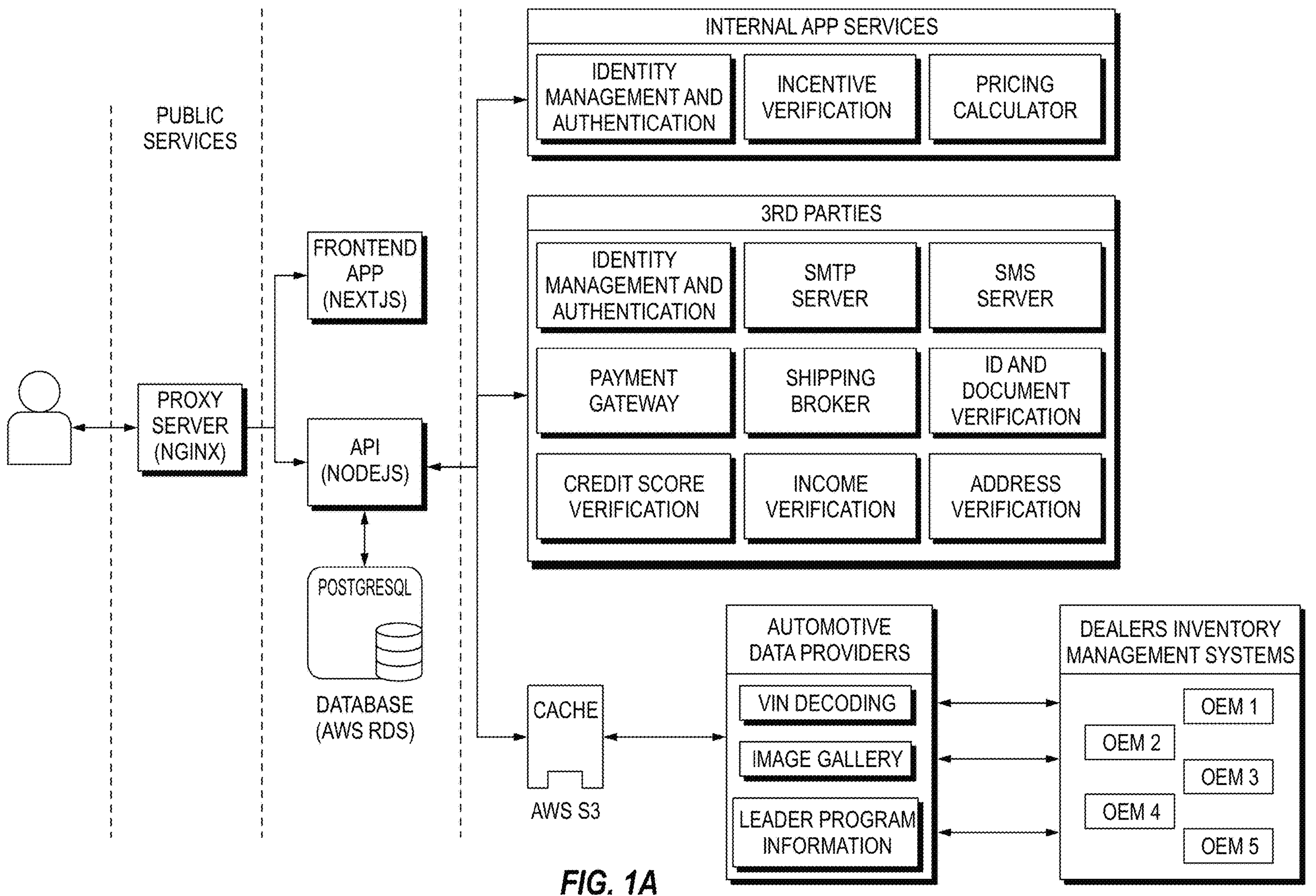
FIGS. 1A-1C are block diagrams illustrating an exemplary transaction platform.
Figure 1B:
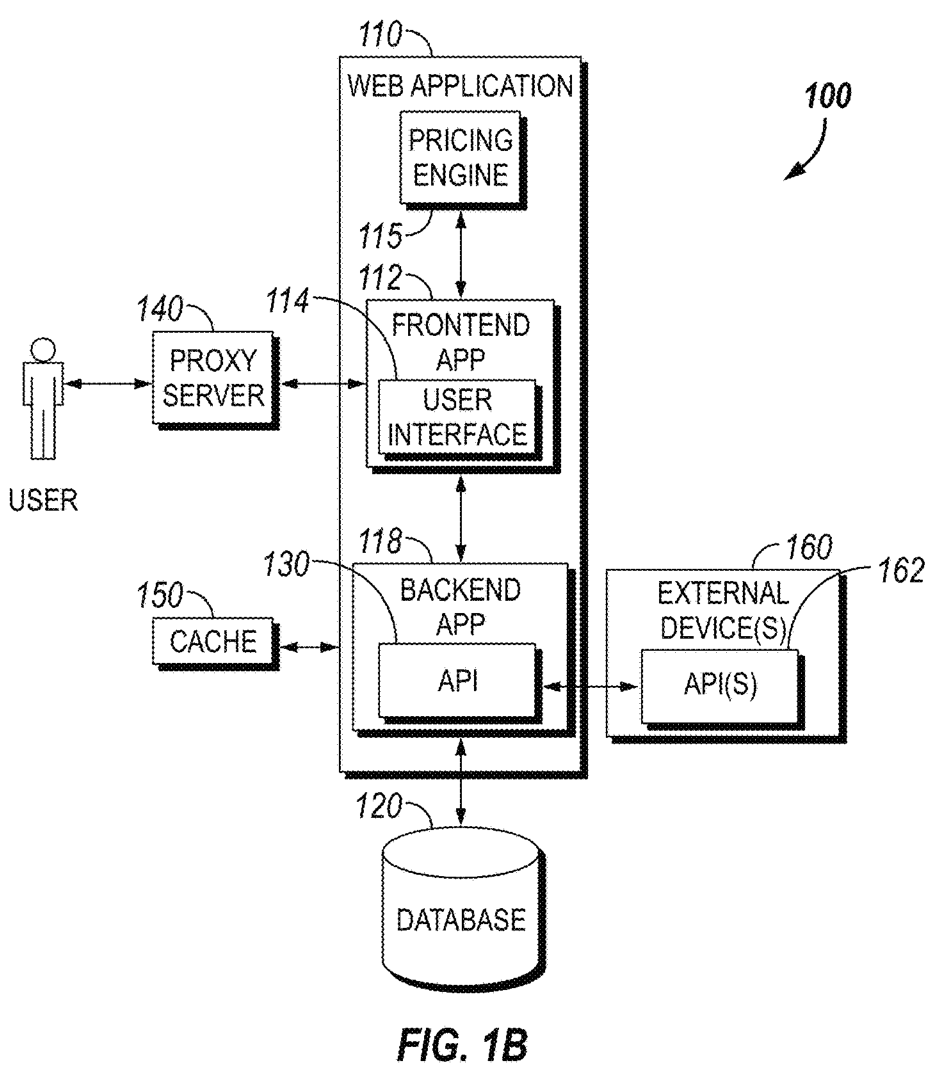
Figure 1C:
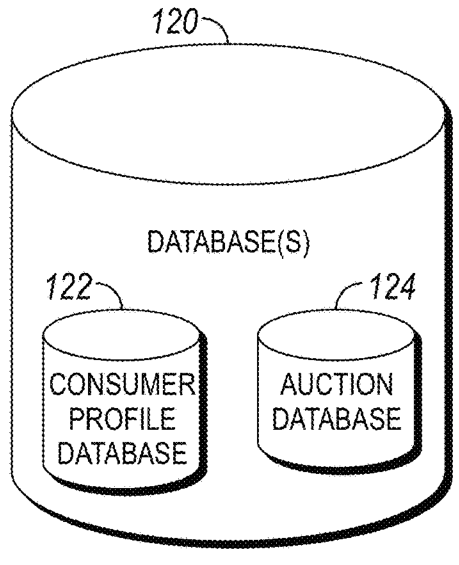

With reference to FIGS. 1A-1C, there is a block diagram illustrating an exemplary transaction platform 100. It shall be appreciated that the transaction platform 100 may be implemented in a variety of applications, including vehicle leasing auctions, vehicle purchase auctions, vehicle leasing countdown auctions, vehicle purchase countdown auctions, vehicle leasing dynamic price auctions, vehicle purchase dynamic price auctions, dealer-consumer vehicle lease auctions, dealer-consumer vehicle purchase auctions, dealer-dealer vehicle transactions, consumer-consumer vehicle lease auctions, vehicle lease transfer transactions, vehicle sale auctions, vehicle sale countdown auctions, vehicle sale dynamic price auctions, dealer-consumer vehicle sale auctions, consumer-consumer vehicle sale auctions, and vehicle trade-in transactions, to name but a few examples, and may be referred to herein as an online transaction platform.

The transaction platform 100 may include a web application 110 having a frontend application 112 and a backend application 118. The frontend application 112 may be configured to generate a web-based user interface 114 and may be structured to communicate with the backend application 118. In some embodiments, the user interface 114 may be built on top of a Next.js application, which may come with a web server and a React.js application. In an example, all pages of the user interface(s) 114 may be built as React components and Material UI library may be used as a basic components' library.

The backend application 118 may be configured to communicate with the frontend application 112, database(s) 120 (e.g., a cloud database, such as AWS relational database services), and a plurality of external devices 160. The backend application 118 may include an application programming interface (API) 130 configured to communicate with third-party APIs 162 hosted on the plurality of external devices 160. For example, the backend application 118 may include a REST API. In an example, the API 130 may be built on top of a Node.js web server configured to provides access to the data layer. Each API model includes a type definition that describes the structure of the corresponding API 130, and may be used by both the frontend application 112 and backend application 118.

In certain embodiments, examples of third-party APIs include Auto Data Solutions by Chrome Data, AWS services, DataOne, Payments (Stripe), and APIs for dealer inventory management systems, to name but a few examples. In certain embodiments, AWS services may be used for S3 storage, SES emails, Lambda, EC2, and ECR. For example, the backend application 118 may use its API 130 to communicate with a third-party API 162 provided by a dealer inventory database, which is an example of an external device 160.

Meanwhile, in an example, the backend application 118 may communicate with the database(s) 120 of the transaction platform 100 using Sequelize.js models as a main interface to the database(s) 120, where each model represents a database table. The API 130 may provide a set of endpoints to read and write models to the database(s). HTTP request methods are used to define action types (GET to read, POST to create, PUT to update, etc.). The API may use the Sequelize.js library to execute SQL queries for the database(s). This library allows simplified work with a relational database(s) and helps to convert SQL tables to JSON responses that the client-side application may use to render pages. In some embodiments, as shown by example in FIG. 1C, the database(s) 120 as described herein may refer to a plurality of databases, such as a consumer profile database 122, an auction database 124, etc.

In certain embodiments, the database(s) 120 such as consumer profile database(s) 122 may not store user credentials, such as a user password. Instead, the web application 110 may store unique user tokens in browser cookies to maintain user sessions. Meanwhile, user credentials may be stored using a third-party service, such as AWS Cognito.

The frontend application 112 may be configured to exchange data with the database 120 and third-party APIs through the backend application 118, such as by using APIs. The frontend application 112 may be configured to communicate with the REST API through the HTTP requests.

The transaction platform 100 may include a proxy server 140, which may be configured to implement both server-side and client-side rendering of the user interface 114. Thus, in an example, for each new web site visitor, the frontend application 112 may render a first page of the user interface 114 on the server-side and then will continue to render pages on the client-side without reloading the page.

The transaction platform 100 may include a cache 150 (e.g., as provided by storage through a web interface such as AWS S3) and/or the database 120 to store data in a manner that is less burdensome than always calling a third-party API for data. In an example, the database 120 may not be a third-party service, but may, for example, be hosted under an AWS account of the transaction platform 100. As described elsewhere herein, the transaction platform 100 may use API 130 to communicate with an API provided by a dealer inventory database and obtain inventory data that is thereafter stored in the database 120 and/or cache 150, thereby reducing the time, compute resources, and/or networking resources that would otherwise be required by obtaining, via a third-party API, the pertinent data from the dealer inventory database each time it is needed by the transaction platform 100. In this way, embodiments as described herein may provide a technical improvement to online transaction platforms by improving speed and reducing use of network resources. In an example, the transaction platform 100 may update the database 120 with the dealer inventory from the dealer inventory databases of all of the dealers utilized by the transaction platform 100.

In certain embodiments, the platform includes one or more docker containers. For example, the proxy server 140 may include Nginx, the frontend application may include Next.js, the API may include Express.js, the database may include PostgreSQL, and an end-to-end test module included in the platform may include Jest or Headless Chrome.

The web application 110 may support different types of users. For example, where the transaction platform 100 is configured to provide an online vehicle auction platform, the type of users may include consumer users and dealer users, as described elsewhere herein. Certain pages of the user interface may be common to multiple types of users. For example, the user interfaces for both consumer users and dealer users may display a landing page, a search page, a profile page, and a watching page. User interfaces for consumers may include additional pages as described herein, such as an auction page and a dealer page. User interfaces for dealers may include additional pages not accessible by consumers, such as described herein, and for example, including a dashboard page and a create listing page.

The web application 110 may include a pricing engine 115 used by both the frontend application 112 and backend application 118. The pricing engine 115 may be configured to calculate different lease variables based on given input. For example, it may calculate monthly lease payment price based on annual mileage maximum, term length, down payment, a received bid, the consumer profile including discounts, and other lease variables. In another example, the pricing engine may calculate a monthly loan payment price based on a down payment, a received bid, the consumer profile including discounts, and other sale variables. In some embodiments, in calculating the monthly lease payment, the pricing engine 115 may optimize the "stackability" of various incentives and rebates available for a vehicle to determine the incentives and/or rebates that lead to maximum gain (e.g., financially) for the user and/or the dealer. This module may be configured to support two-way calculations, meaning that it may calculate a monthly payment price based on a bid and vice versa.

In some embodiments, the transaction platform 100 including features described herein (e.g., such as networking, databases, APIs, web applications, proxies, caches, etc.) may be provided by a microservice architecture, for example, such as provided by a third-party vendor (e.g., AWS). For example, the enumerated features of the transaction platform 100 (e.g., the web application 110) may be provided by computing processes such as on a computing device 300 discussed in relation to FIG. 3. In some embodiments, the microservices may be containerized (e.g., a separate computing device for the frontend application 112, backend application 118, etc.). The microservices architecture for the transaction platform 100 may include resources such as networking databases, computing instances, SMTP server(s), and cognitive syndication tools.

In some embodiments, the transaction platform may not include a web application, but instead may include an application stored on and executed by a mobile device or other computing device for each user that renders the corresponding user interface. It shall be appreciated that any or all of the foregoing features of the transaction platform may also be present in the other transaction platforms disclosed herein.

Figures 2, 3:
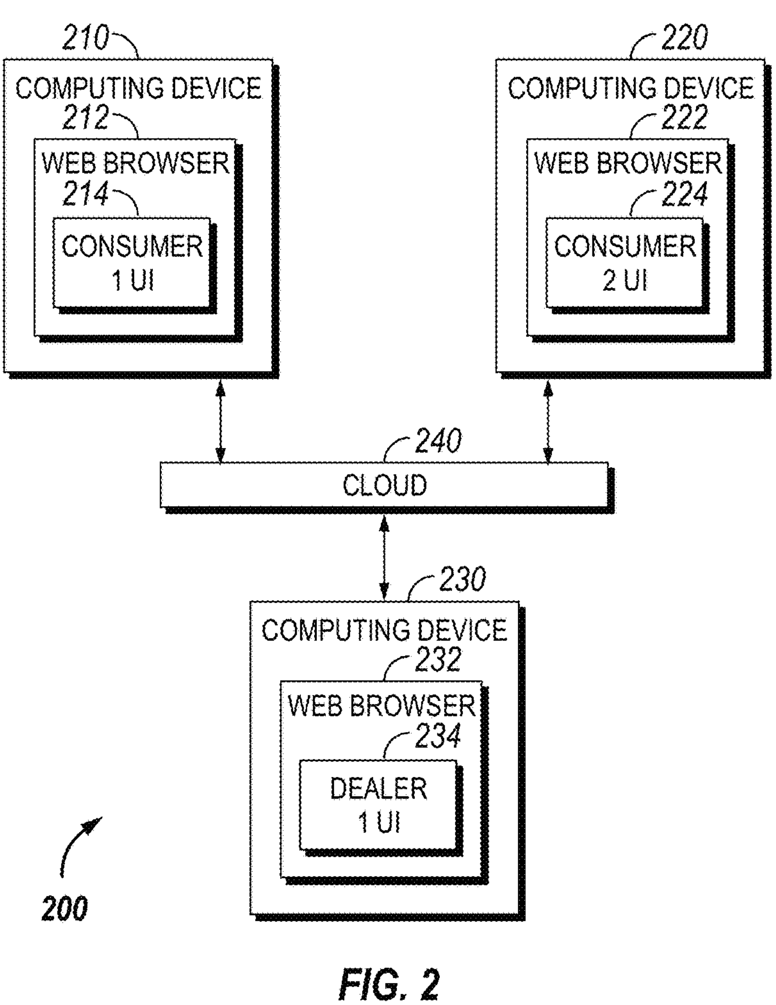
FIG. 2 is a block diagram illustrating an exemplary transaction platform including computing devices with customized user interfaces.
FIG. 3 is a block diagram illustrating an exemplary computing device.

With reference to FIG. 2, there is a block diagram illustrating an exemplary transaction platform 200 including computing devices 210, 220, 230 in communication with a cloud system 240. Each computing device 210, 220, and 230 (e.g., a smartphone, a personal computer, a laptop, etc., which may have some or all of the features of the computing device 300 discussed in relation to FIG. 3) is structured to display a respective user interface 214, 224, and 234 (e.g., such as a web-based user interface 114) in a respective web browser application 212, 222, and 232. For consumers, the computing devices 210 and 220 may respectively render a consumer user interface 214 and 224. As explained in more detail herein, the displayed user interface for each consumer may be based on the consumer profile of the user, such that each consumer user interface 214 and 224 may simultaneously display different transaction parameters for the same transaction specific to each consumer. It shall be appreciated that a transaction may be an auction of an item, such as a vehicle lease or a vehicle, a cash sale of an item, or a sale of an item combined with financing products for the sale, and may include the completion of the steps necessary to transfer property rights in a vehicle to the consumer, or may be merely putting two parties into contact in order to finalize the transfer of property rights. The consumer user interfaces 214 and 224 may include a plurality of pages, such as a consumer profile intake page, a search results page, and an auction page, to name but a few examples. The dealer user interface 234 may include a plurality of pages, such as a transaction listing page and a dashboard page, to name but a few examples. It shall be appreciated that any or all of the foregoing features of the transaction platform may also be present in the other transaction platforms disclosed herein.

With reference to FIG. 3, there is illustrated a block diagram of a computing device 300. Computing device 300 is one example of a computing device which is used, in different embodiments, in connection with an exemplary transaction platform, such as the computing devices used in the microservices architecture of FIGS. 1A-1C. Computing device 300 may include a processing device 302, input/output devices 304, and a memory device 306. Computing device 300 may be a stand-alone device, an embedded system, or a plurality of devices structured to perform the functions described with respect to an online transaction platform.

Input/output devices 304 may enable the computing device 300 to receive input from a user and transmit an output to a user (e.g., for the user interfaces described herein). Input/output devices 304 may comprised of hardware, software, and/or firmware. For example, input/output devices 304 may include a keyboard, a touch screen, a mouse, an electronic display screen, a printer, an alarm, or a visual indicator, to name but a few examples.

Input/output devices 304 may also be structured to allow computing device 300 to communicate with one or more external devices 310. For example, input/output devices 304 may include a network adapter, network credential, interface, or a port (e.g., a USB port, serial port, parallel port, an analog port, a digital port, VGA, DVI, HDMI, Fire Wire, CAT 5, Ethernet, fiber, or any other type of port or interface), to name but a few examples. It is contemplated that input/output devices 304 may include more than one of these adapters, credentials, or ports.

External devices 310 in different embodiments may be any type of device that allows data to be input or output from computing device 300. For example, external devices 310 may include a cloud system, a consumer computing device, or a dealer computer device, a mobile device, a reader device, equipment, a handheld computer, a diagnostic tool, a controller, a computer, a server, a printer, a display, an alarm, a visual indicator, a keyboard, a mouse, or a touch screen display. Furthermore, it is contemplated that external device 310 may be integrated into computing device 300. It is further contemplated that more than one external device may be in communication with computing device 300.

Processing device 302 in different embodiments may be a programmable type of processor, a dedicated, hardwired state machine, or a combination of these. Device 302 may further include multiple processors, Arithmetic-Logic Units (ALUs), Central Processing Units (CPUs), Digital Signal Processors (DSPs), Field-programmable Gate Array (FPGA), to name but a few examples. For forms of processing device 302 with multiple processing units, distributed, pipelined, or parallel processing may be used as appropriate. Processing device 302 may be dedicated to performance of just the operations described herein or may be utilized in one or more additional applications. In the illustrated form, processing device 302 may be of a programmable variety that executes processes and processes data in accordance with programming instructions (such as software or firmware) stored in memory device 306. Alternatively or additionally, programming instructions may be at least partially defined by hardwired logic or other hardware. Processing device 302 can be comprised of one or more components of any type suitable to process the signals received from input/output devices 304 or elsewhere, and provide desired output signals. Such components may include digital circuitry, analog circuitry, or a combination of both.

Memory device 306 in different embodiments may be of one or more types, such as a solid-state variety, electromagnetic variety, optical variety, or a combination of these forms, to name but a few examples. Furthermore, memory device 306 may be volatile, nonvolatile, transitory, non-transitory or a combination of these types, and some or all of memory device 306 can be of a portable variety, such as a disk, tape, memory stick, cartridge, to name but a few examples. In addition, memory device 306 can store data that is manipulated by processing device 302, such as data representative of signals received from or sent to input/output devices 304 in addition to or in lieu of storing programming instructions executable by the processing device 302, just to name one example. As shown in FIG. 3, memory device 306 may be included with processing device 302 or coupled to processing device 302, but need not be included with both. It shall be appreciated that any or all of the foregoing features of computing device 300 may also be present in the other transaction platforms disclosed herein.

Figure 4:
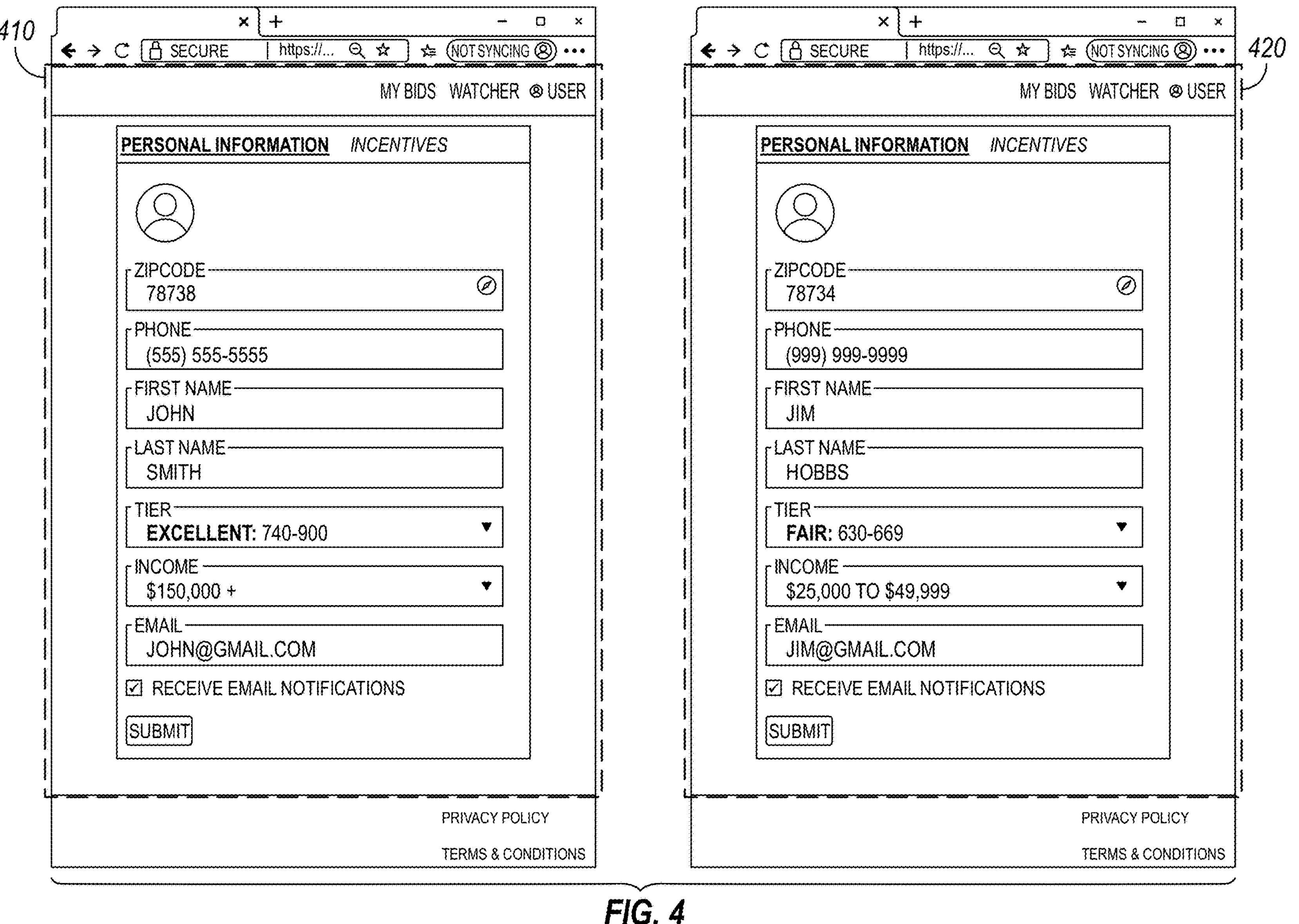
FIGS. 4 and 5 illustrate exemplary consumer profile intake pages displayed in a user interface for a first and second consumer.
Figure 5:
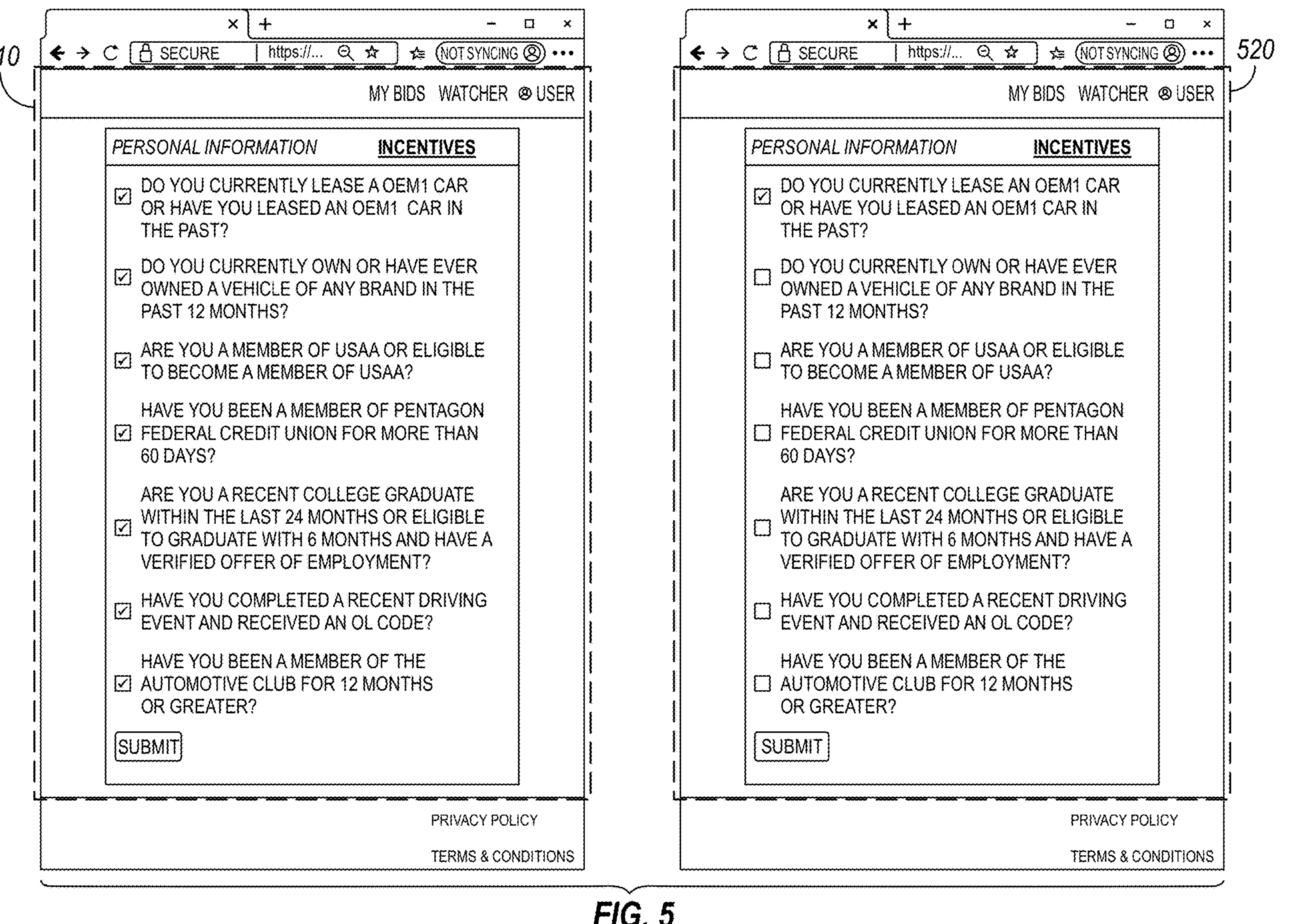

With reference to FIGS. 4 and 5, there is illustrated exemplary consumer profile intake pages, one intake page 410 of FIG. 4 and one intake page 510 of FIG. 5 being displayed in a user interface for a first consumer (e.g., a web-based user interface 114 provided by a frontend application 112 of FIG. 1A), and the other intake page 420 of FIG. 4 and the other intake page 520 of FIG. 5 being displayed in another user interface for a second consumer (e.g., also a web-based user interface 114 provided by a frontend application 112 of FIG. 1A). As illustrated in FIG. 4, the consumer profile intake pages may include fields for each user to enter a zip code, phone number, name, annual income, credit score tier, and email address. As illustrated in FIG. 5, the second consumer profile intake pages 510 and 520 may include fields for each user to identify discounts for which the user is qualified to receive on the vehicle lease. Data received from the consumer profile intake pages may be added to the consumer profile for the corresponding user. In some embodiments, additional profile information may be provided by the user to the platform 100 during an auction based on the specifics of that transaction. For example, during an auction for which an incentive or rebate is offered for members of a certain organization, and the platform 100 did not previously gather such information as part of the user's profile, the platform 100 may allow the user to indicate whether they are a member of that organization. In some embodiments, to reduce the number of questions upon signing up, the consumer profile intake page may include core questions that are relevant to most manufacturers, and only ask more vehicle-specific questions (e.g., as additional profile information) during an auction.

The consumer profile for each user may include personal information for the user, including user credit score or a credit score range (e.g., tier), an age, and an income or income range, to name but a few examples. In certain embodiments, the consumer profile includes a portion of a credit score, such as a data subset of a credit score directed to determining the likelihood of paying a monthly lease payment or paying a monthly loan payment. In certain embodiments, the consumer profile may include information related to a cosignor. For example, cosignor information may be added to a consumer profile when the consumer's credit score is less than 600. The consignor information may include the cosignor's credit score, age and income, to name but a few examples.

The consumer profile for each user may include one or more discounts for which the user qualifies. The discounts may include incentives, rebates or discounts (such as absolute dollar amounts and percentage amounts and may be monetary or other consideration, like an extended warranty, service plan, complimentary or other goods or services or the like) given by a dealer, a vehicle manufacturer, a provider of financing, a governmental entity or the like. The discounts may include financier incentives, financier rebates, sales tax credits and state and federal tax rebates, to name but a few examples. An incentive may be understood to be an amount taken off the Manufacturer Suggested Retail Price (MSRP) before the transaction is in effect. A rebate may be understood to be an amount received by the dealer or consumer after the transaction has been finalized.

In certain embodiments, the consumer profile may include data that was not manually entered by a consumer. For example, the transaction platform API 130 may request a credit score from a third-party API of an external device 160 that provides credit scores (e.g., a credit bureau system). In certain embodiments, the credit score is only requested after the consumer has won an auction in order to reduce API-related costs. In some embodiments, the platform 100 may attempt to do a soft-credit pull before allowing the consumer to bid, and if a successful response is not achieved from the soft-credit pull, the platform 100 may ask the consumer to provide their best estimate to ensure that an accurate price is displayed for the consumer. This may be followed by a credit pull after the auction is over to ensure that the platform 100 is using the appropriate scoring methodology that aligns with the OEM (for example, there may be many different scoring methods employed by different OEMs (FICO® Auto Score 4, FICO® Auto Score 8, FICO® Auto Score 9, etc.)). In certain embodiments, the transaction platform API may reduce costs by transmitting batches of API requests at one time. In certain embodiments, the transaction platform searches a cache to determine if the information requested by an API request is already known to the transaction platform. For example, if the transaction platform needs a vehicle identification number (VIN) description, the platform first checks the cache for the VIN without transmitting an API request, then uses the VIN description in the cache. In other embodiments, the transaction platform may submit a request only to confirm there have been no changes to the description in cache, as opposed to requesting the full description.

In certain embodiments, the consumer profile indicates whether a consumer is verified. To become a verified consumer, at least a portion of the consumer profile must be verified. For example, a consumer may become verified by submitting documentation to prove credit score, income, and discount eligibility. Alternatively, all or a portion of the documentation may be obtained automatically with the consumers permission. For example, a credit score could be obtained from an electronic request to a credit reporting agency.

In certain embodiments, the consumer profile includes a consumer verification score. For example, when a consumer's credit score, income, date of birth, and inventive eligibility has been verified, the consumer may receive a score of 100%. A consumer with less information verified would receive a reduced score. In certain embodiments, the auction page viewable by the consumer may include the verification scores of other consumers that have bid on the vehicle lease or purchase so that the consumer is informed about the likelihood of transaction completion, or the likelihood that the winning bidder will actually execute the lease or purchase with the dealer. Similarly, the dealer may receive and use the verification score of a consumer, in part to determine the likelihood of the consumer completing the transaction. Where the first winning bidder does not execute the lease or purchase, the dealer may extend a second chance offer to the bidder with the second highest bid. Part of the verification score may include receiving a payment from the consumer as a prerequisite for submitting a bid on a transaction.

In certain embodiments, the consumer profile includes a subscription status of the consumer. The subscription status may indicate the consumer has no subscription, or that the consumer corresponds to one of a plurality of subscription tiers. For example, for a first subscription tier, the consumer may be able to participate in more transactions than a consumer without a subscription. In certain embodiments, a consumer with a subscription must wait for a waiting period before gaining the benefits of the subscription. In certain embodiments, the additional transactions may be limited to a set of original equipment manufacturers (OEMs) selected by the consumer. In certain embodiments, for a first subscription tier, the consumer may gain access to exclusive transactions that consumers without a subscription cannot access. In certain embodiments, a subscription tier may provide the additional benefit of early access to a transaction prior to that transaction being made available to consumers without a subscription. In certain embodiments, a subscription tier may provide finance and insurance add-ons as part of the package such as rim and tier protection or paintless dent repair protection.

In embodiments, the consumer profile may be stored in the consumer profile database 122 by the transaction platform 100.

Figure 6:
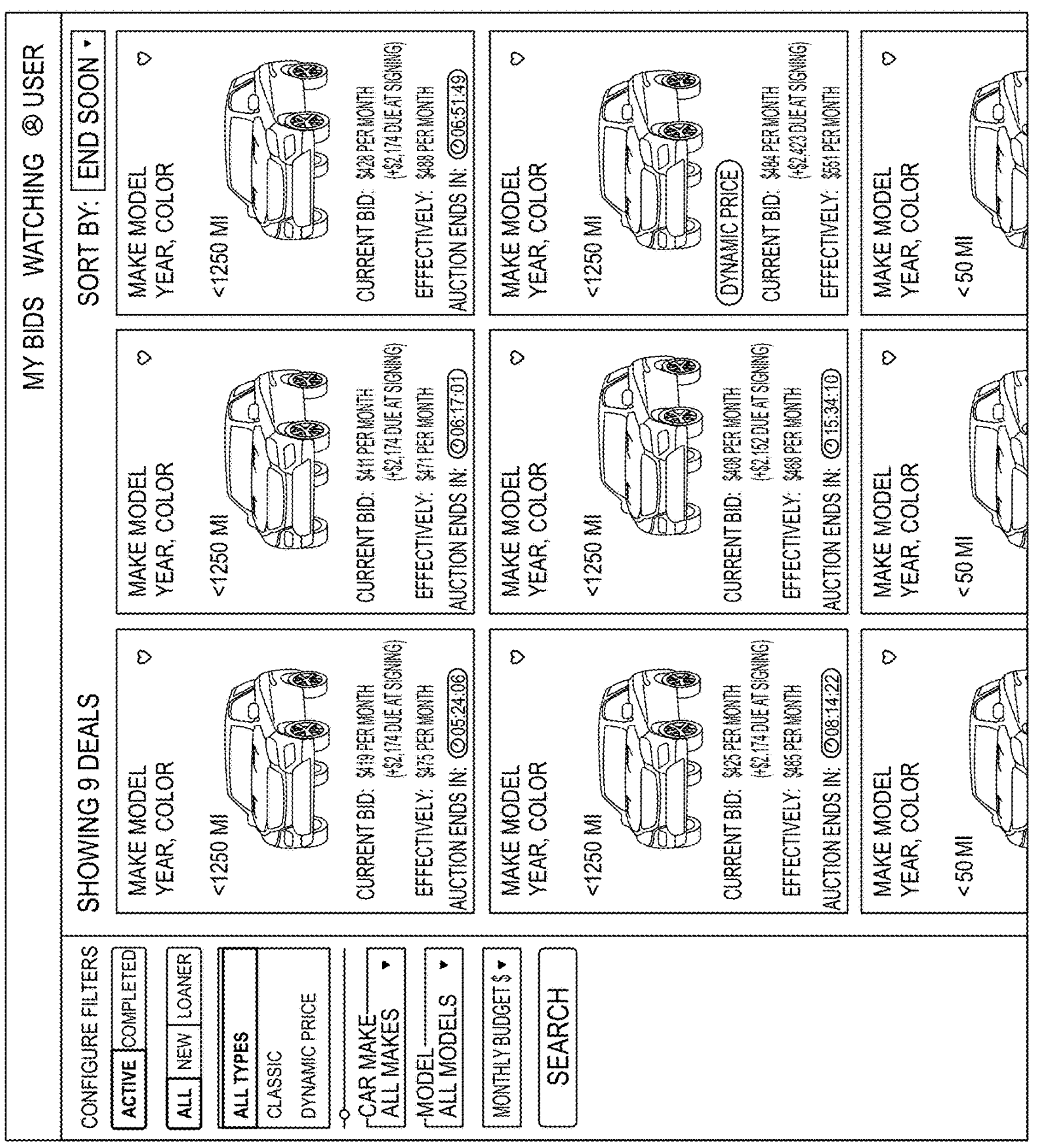
FIG. 6 illustrates exemplary search results displayed in a user interface.

With reference to FIG. 6, there is illustrated an exemplary search results page displayed in a user interface. The user may input search parameters, as illustrated in the left column, the input parameters including auction status, vehicle condition, auction type, price range, vehicle make, vehicle model, and monthly budget. In certain embodiments, the user may select other search parameters. For example, the consumer may also filter the search results by the type of transaction, such as limiting the results to consumer-consumer lease transfer auctions. After submitting the search parameters, the results are displayed in the right column. In certain embodiments, the displayed results are based on the consumer profile. For example, auctions may be excluded from the search results based on a consumer's income, age, or credit score, to name but a few examples.

In embodiments, a dealer may specify consumer characteristics that must be fulfilled in order for the auction to be displayed to the consumer. For example, the dealer may make an auction available to verified consumers only, or available to consumers having a verification score above a certain threshold. For consumers without the requisite verification, unavailable auctions may be excluded from a results page, or included with a note indicating the consumer has not been sufficiently verified to bid on the auction.

The transaction platform includes a recommendation engine configured to identify preferred available transactions for a consumer based on the consumer profile and/or machine learning. In certain embodiments, the recommendation engine may use vehicle parameters specified by the consumer, such as make, model, and monthly payment maximum or range. In certain embodiments, the recommendation engine may use macroeconomic factors, such as a stock market index, microeconomic factors, such as vehicle inventory, or hybrid factors, such as the Manheim index. It shall be appreciated a transaction platform may include more than one recommendation engine, each recommendation engine being configured to perform all or a portion of the engine features described herein.

In certain embodiments, the recommendation engine identifies and displays active lease auctions. To determine which of the active lease auctions to identify as recommended vehicle leases, the recommendation engine may compare historical data to the active auction. The recommendation engine determines consumer-favorable outlier auctions in the set of possible active auctions. The historical data may include a lease residual, a money factor, discount amounts, and the maximum dealer discount, all of which may change on a regular basis, such as from month to month.

In certain embodiments, the recommendation engine identifies and displays the best transactions for vehicles which will be available over a time window. For example, the recommendation engine may suggest the best transaction for a particular type of vehicle that will occur within the next three months. In order to forecast vehicle prices over the time period, the recommendation engine may use historical data from past auctions, geography, dealer sales targets, dealer inventory, and the consumer's desired monthly payment, to name but a few examples. For purpose of illustration, a consumer may submit a $400 maximum monthly payment, a two-month time window, and vehicle characteristic requirement of a four wheel drive vehicle to the recommendation engine. In response, the recommendation identifies to the consumer the vehicles of the highest value within the parameters.

In certain embodiments, the recommendation engine analyzes a current auction and provides guidance to the consumer. For example, the auction page may display a grade for each consumer, such as great transaction, good transaction, and fair transaction. The recommendation engine may determine the guidance based on historical data of past auctions. The recommendation engine may also provide a guidance based on the consumer profile in order to explain the transaction grade. For example, the recommendation engine may notify the consumer that an auction is a great transaction because a maximum value of discounts can be applied to the transaction.

In certain embodiments, the recommendation engine predicts a transaction outcome and provides the predicted outcome to the consumer. The predicted outcome may include a predicted winning bid or a predicted winning monthly payment based on the lease terms or financing entered by the consumer. The predicted outcome may be based on historical data from past auctions, the number of consumers interested in the auction, and the consumer profile, to name but a few examples. For both traditional and countdown auctions, the predicted outcome may be displayed on the auction page.

In certain embodiments, the recommendation engine may identify and display transactions for a specific consumer based on the subscription status of the consumer. If the consumer holds a subscription, the consumer may receive displayed transactions unavailable to the another consumer without a subscription.

It is important to note that the consumer profile affects the terms of the transactions of the platform. In certain embodiments, the consumer profile may determine whether the consumer is allowed to participate in a transaction. For the purposes of illustration, FIGS. 7-10 depict an auction from the perspective of the two users who entered the information into the consumer profile intake pages illustrated FIGS. 4-5. The consumer user interface that appears on the left of FIGS. 4-5 and 7-10 is the first consumer, and the consumer user interface that appears to the right of the user interface for the first consumer is the second consumer. The rightmost user interface is the dealer user interface, which includes a current percentage discount off of MSRP for the auction. As bidding changes the minimum selling price, the percentage discount changes accordingly.

Figure 7:
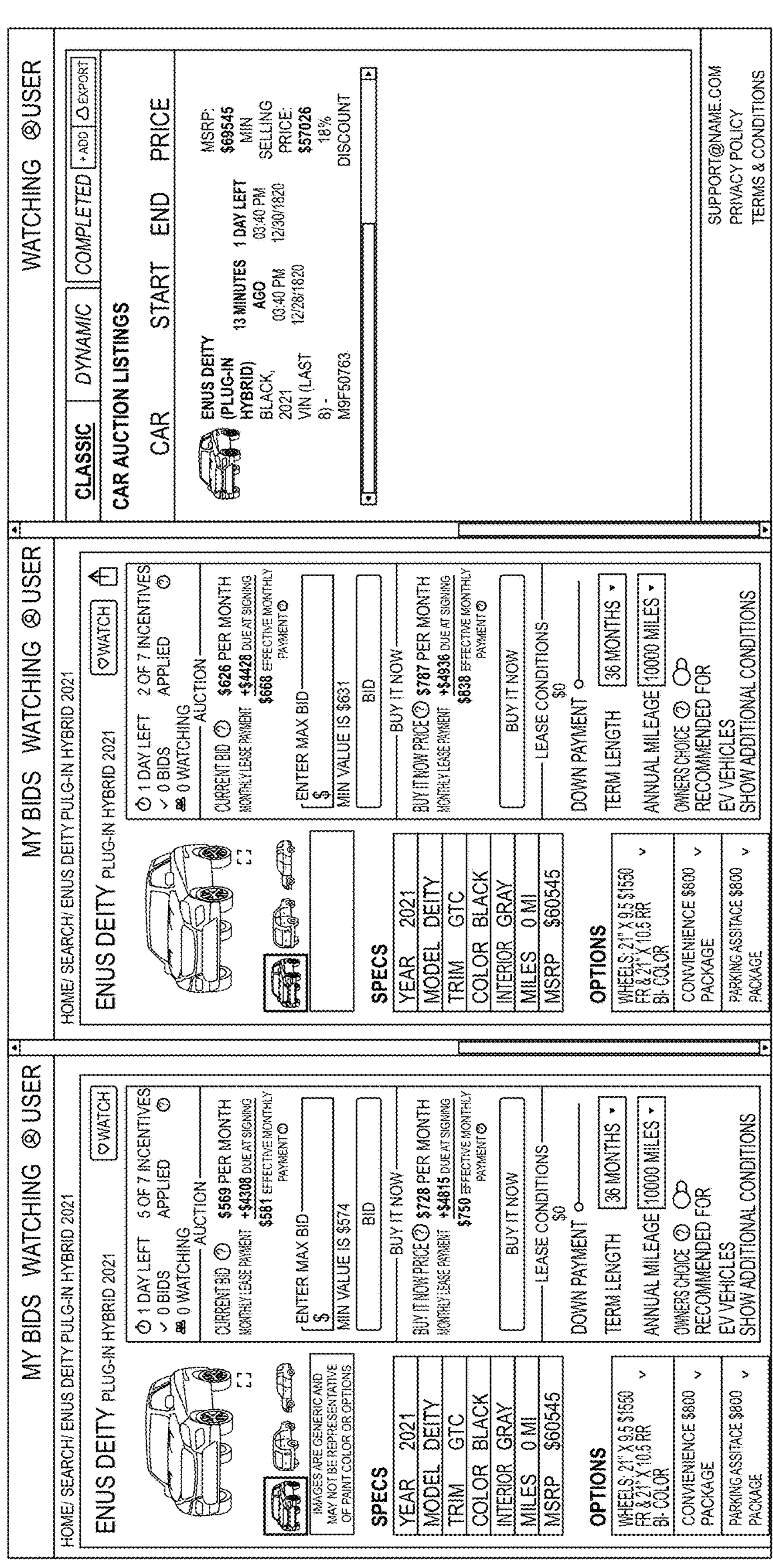
FIG. 7 illustrates an auction displayed on two consumer user interfaces and a dealer user interface.

With reference to FIG. 7, there is illustrated an exemplary vehicle lease auction page displayed on two consumer user interfaces and a dealer user interface. Each consumer user interface includes a visual representation of the auction item, a minimum selling price including a monthly payment and a down payment, a plurality of fields for inputting a bid, and a buy it now purchase offer. The plurality of input fields includes a field to enter a monthly payment amount, a field to input a down payment, a field to input a lease term length, a field to input an annual mileage maximum, and a field to enter whether the consumer would like to structure the lease as a purchase in order to qualify for certain tax credits. It shall be appreciated that the exemplary lease auction page could be adapted into a vehicle sale page. For example, a vehicle sale auction page may also include a visual representation of the auction item (the ownership interest in vehicle), and the minimum selling price including the monthly loan payment and the down payment. In certain embodiments, the monthly loan payment may be based on the down payment, received lenders rate information and the consumer profile, to name but a few examples.

The dealer user interface displays a listing of the auction including a visual representation of the auction item, the current minimum selling price, and a percentage discount of the vehicle lease or purchase.

For an auction, the minimum selling price includes a monthly payment amount, a down payment and may include other terms, such as the lease term and annual mileage. For a cash sale, the minimum selling price includes a sale price. For a sale auction, the minimum selling price may include a monthly loan payment amount and a down payment.

It is important to note the two consumer auction pages display two different minimum selling prices simultaneously. The minimum selling price is unique to each consumer and is determined by a pricing engine of the transaction platform. In certain embodiments, the minimum selling price is the relative price for which the vehicle lease or purchase will be sold. In other embodiments, the minimum selling price is the price the consumer will need to bid to overbid the current highest bid.

The pricing engine uses the sale or lease terms specified by the consumer on the auction page and the consumer profile for a given consumer to determine a minimum selling price of a transaction. For example, the pricing engine may determine the monthly lease or loan payment amount of the minimum selling price based on the consumer profile. The pricing engine considers factors, including at least one of the consumer's credit score, age, and income, as well as discounts for which the consumer qualifies.

In order to determine which discounts for which the consumer qualifies, the pricing engine may use the information in the consumer profile. For example, a consumer may need a certain income to qualify for certain discounts. Some discounts are mutually exclusive and may not be applied to the same transaction. The pricing engine determines which of the discounts that the consumer qualifies for can be applied to one transaction. The pricing engine may also determine the minimum selling price based on whether the consumer is verified or using their verification score.

In certain embodiments, the pricing engine determines the minimum selling price by assigning weights to each personal information factor. In certain embodiments, the pricing engine uses the discount factors to determine if the minimum selling price and uses the personal information factors to determine if the consumer qualifies to participate in the transaction. In certain embodiments, the minimum selling price for each consumer is a function of the percentage discount parameter specified by the dealer, such that the winning bidder is the consumer willing to execute the lease or purchase for the smallest dealer discount.

In certain embodiments, the pricing engine uses a subscription status of the consumer to determine the minimum selling price of a transaction. For example, a consumer with a subscription may have a lower minimum selling price than a consumer without a subscription.

In certain embodiments, the initial minimum selling price is an amount below a reserve price set by the dealer. Unless the minimum selling price increases to the reserve price, no bidder will win the auction. In certain embodiments, the initial minimum selling price is set to zero. The reserve price may be displayed on the consumer auction page, or hidden from the consumer.

In certain embodiments, the consumer user interface, such as the auction page, is configured to display a dealer rating.

The consumer interface may also include a dealer profile page including historical transaction data for the dealer. The dealer rating may be based on the completion rate of transactions listed by the dealer on the transaction platform. In certain embodiments, the dealer interface may display a consumer rating to the dealer, the consumer rating based on the completion rate of transactions by the consumer.

In certain embodiments, the transaction platform accepts financial account information and payment from the consumer following a successful auction bid. In other embodiments, the financial component of the transaction, such as a vehicle lease or purchase is completed offline.

In certain embodiments, a consumer user interface may include a buy it now purchase offer section, where a consumer may agree to a minimum purchase price including a monthly payment and down payment before the auction has ended. In certain embodiments, the monthly payment and down payment are static. In certain embodiments, at least one of the monthly payment and the down payment are adjusted during the auction. The adjustment may be linear, whereby the price drops a certain amount or percentage over time.

In certain embodiments, a user interface for a consumer having a consumer profile indicating a subscription may allow the consumer to submit a buy it now purchase offer before the transaction is available to consumers without a subscription. For example, a consumer with a subscription may have an hour before an auction is available to consumers without a subscription to accept a purchase offer including the minimum selling price displayed for the consumer. A subscription may also modify the terms of the transactions, such as decreasing a delivery fee or increasing a delivery radius.

In certain embodiments, the adjustment may be determined using machine learning or historical data from other auctions and factors of the current auction, such as the number of consumers viewing the auction, the number of consumers watching the auction, the number of consumers bidding on the auction, certain attributes of the consumers viewing, watching and bidding, vehicle availability, and an adjustment in a dealer's certainty for sale parameter, to name but a few examples. A consumer views the auction when they use a user interface to display the auction based on the consumer's consumer profile. A consumer watches the auction by adding the auction to a list that is viewable on the user interface, or by requesting that the transaction platform transmits a notification regarding the auction in response to an event of the auction. A consumer bids on the auction when the consumer, using the user interface, submits an updated minimum selling price that exceeds the current minimum selling price. The adjustment may be an increase or a decrease. For example, a buy it now purchase offer may increase in cost if the number of consumers watching the auction is higher than the number of consumers watching similar historical auctions. In another example, the buy it now price may be increased above MSRP for vehicles with low availability.

In certain embodiments, dealers may auction a short-term vehicle lease for leased vehicles returned early to the dealership by the leasees. The short-term lease may be for a term between 2 and 6 months, to name but one example. Normally, when a leasee returns a vehicle to the dealership early in order to sign a new lease, the dealership is obligated to pay the remaining payments and return the vehicle to the manufacturer. Instead, the transaction platform allows the dealer to recoup all or a portion of the money lost from paying the remaining lease payments.

Figure 8:
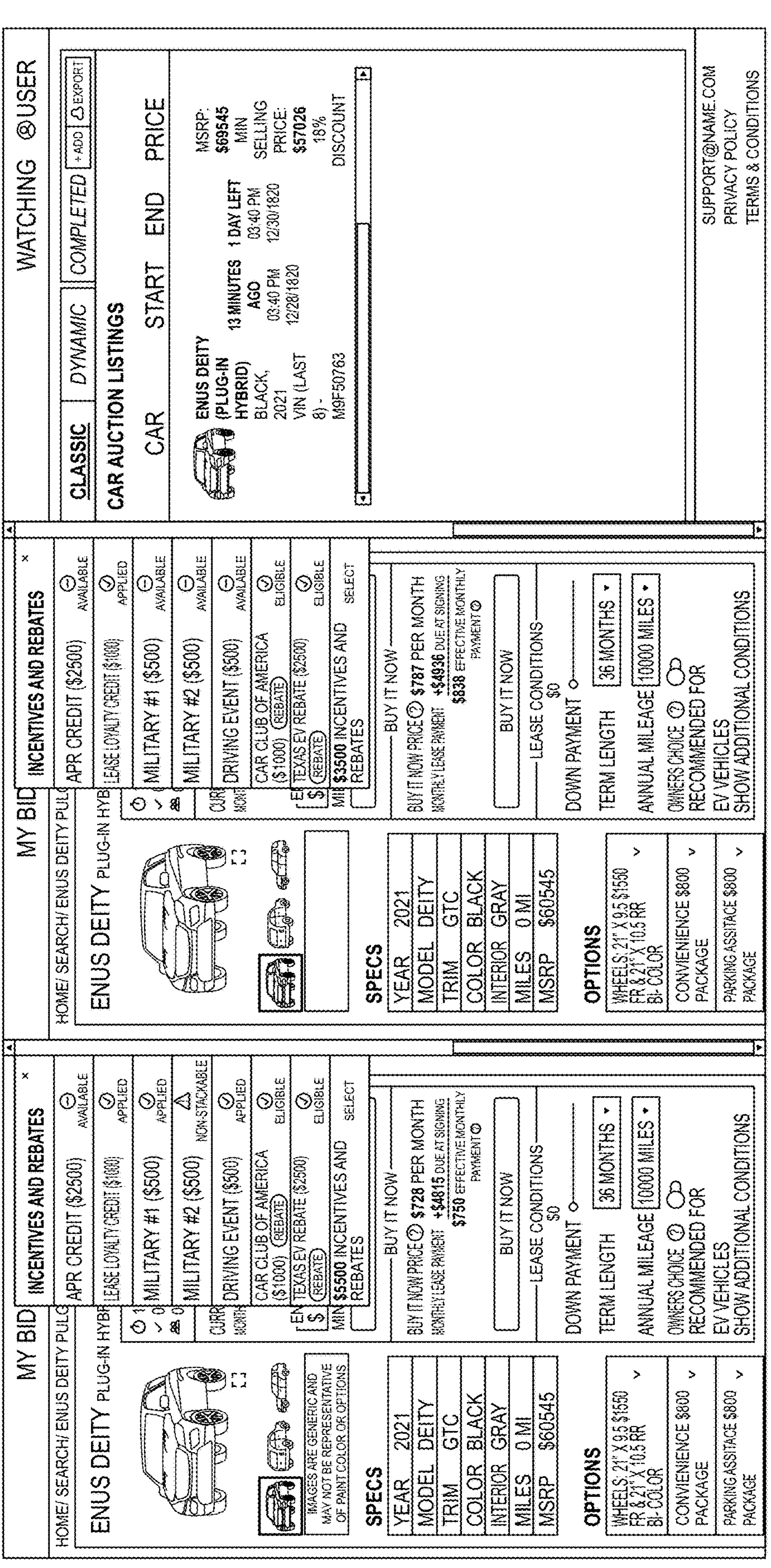
FIG. 8 illustrates an auction displayed on two consumer user interfaces including discount information and a dealer user interface.

With reference to FIG. 8, there is illustrated the auction pages of FIG. 7 for the first and second user including discount information. As show in the figure, the consumer profile of the first user corresponds to $5,500 in discounts while the consumer profile for the second user corresponds to only $3,500 in discounts. The difference in discounts, along with other differences in the consumer profile illustrated in FIGS. 4-5, causes the lower minimum selling price and buy it now price for the first user relative to the second user. The dealer page includes a percentage discount off the MSRP.

Figure 9:
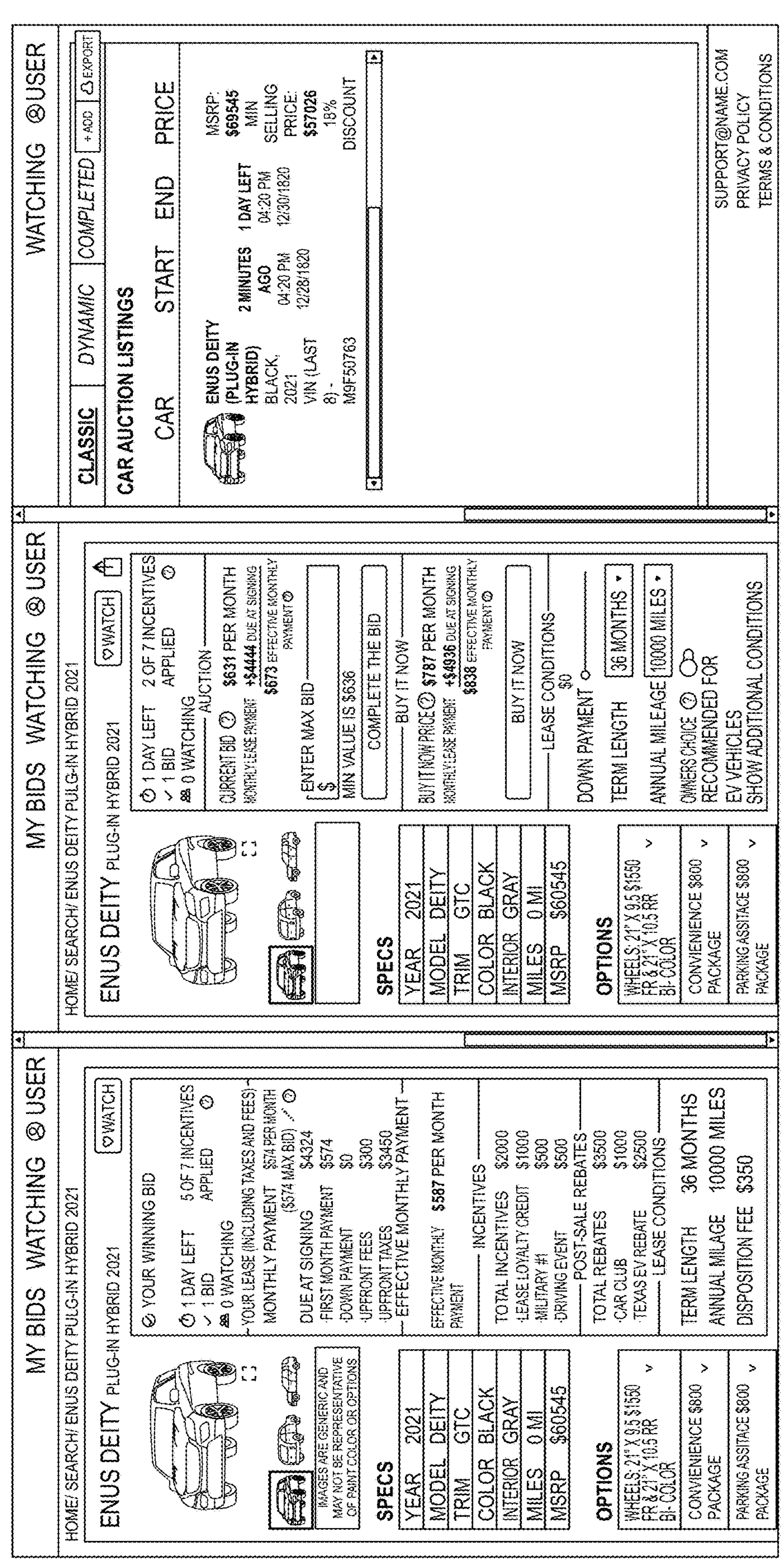
FIG. 9 illustrates an auction displayed on two consumer user interfaces and a dealer user interface where the first consumer user interface has received a bid.

With reference to FIG. 9, there is illustrated an auction displayed on two consumer user interfaces and a dealer user interface where the first user has submitted a bid with the first user interface. As a result, the minimum selling price for the second user has increased even though the bid submitted by the first user included a monthly payment amount that was less than the initial minimum selling price for the second user.

In certain embodiments, once a consumer has bid on the auction, the transaction platform notifies the dealer or marks the vehicle as sold in the dealer inventory system. In certain embodiments, once a certain amount of time remains in the auction, such as 48 hours, the transaction platform notifies the dealer or marks the vehicle as sold in the dealer inventory system. By marking the vehicles as sold in the dealer inventory systems, the dealer ensures the vehicle of the auction is not accidentally sold to another consumer, such as through another channel.

Figure 10:
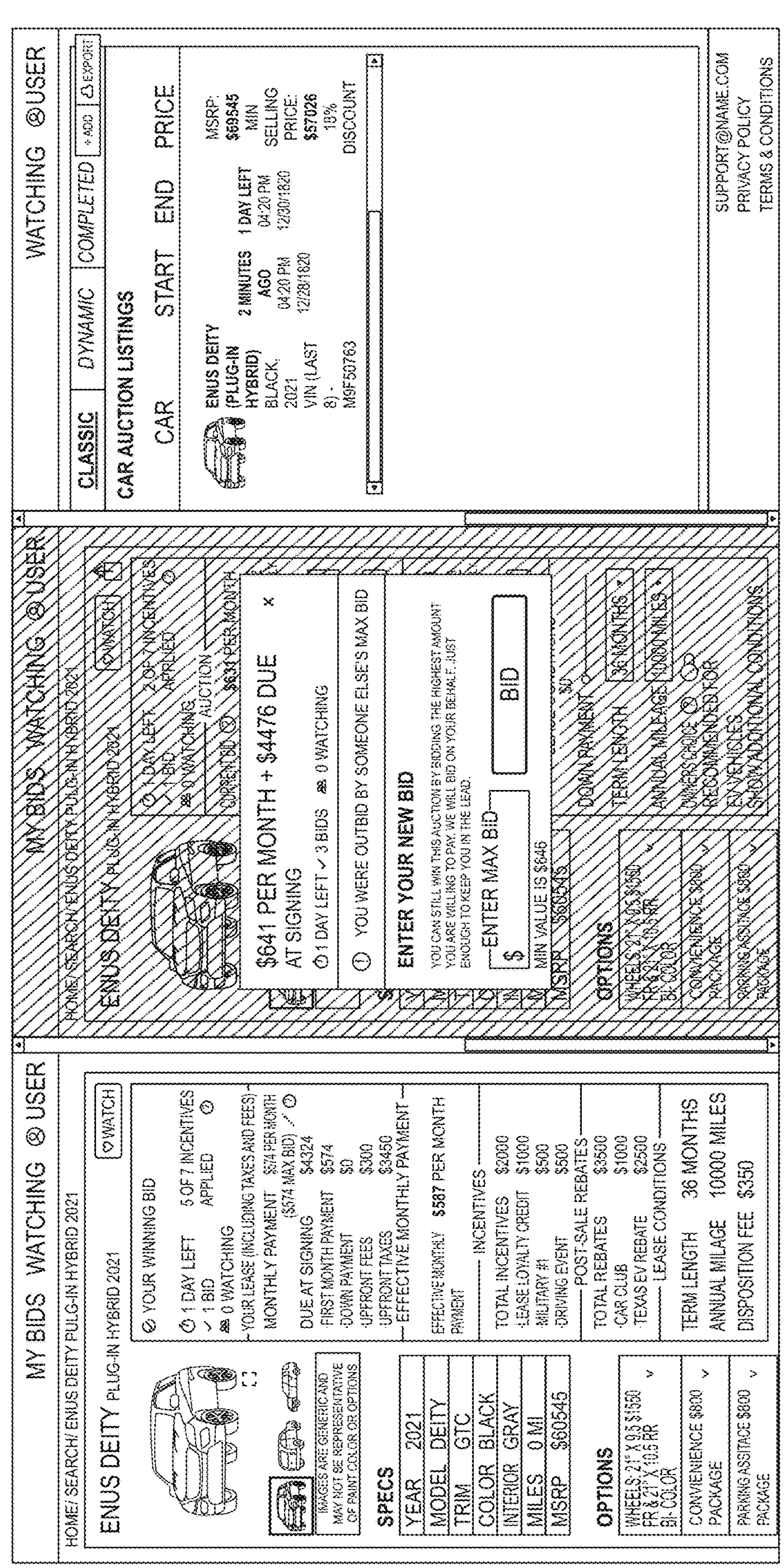
FIG. 10 illustrates an auction displayed on two consumer user interfaces and a dealer user interface where the second consumer user interface indicates a previous bid received by the second consumer user interface has been outbid.

With reference to FIG. 10, there is illustrated an auction displayed on two consumer user interfaces and a dealer user interface where the second consumer user interface indicates a previous bid received by the second consumer user interface has been outbid by the first user, even though the second user bid included a monthly payment higher than the bid of the first user.

In certain embodiments, the consumer user interface includes a lease listing page where a consumer may create an auction to sell the remaining interest in a vehicle lease to another consumer. In order to win the auction, the consumer-buyer bids on an incentive amount. In certain embodiments, the incentive amount is an amount the original leasee pays the consumer-buyer for the consumer-buyer to assume the lease. Consumer-buyers bid against one another resulting in a lower incentive for the original leasee to pay. In certain embodiments, the incentive amount is an amount the consumer-buyer pays the original lessee to assume the lease. For example, the consumer-buyer may pay to assume the lease if the original lessee paid a substantial down payment which would be returned at the end of the lease. The consumer-consumer lease transfers auctions could appear in the search results in a search results page of the consumer user interface. In certain embodiments, the pricing engine of the transaction platform suggests an initial incentive based on historical auction data.

In certain embodiments, the consumer interface includes a trade-in listing page where a consumer may create an auction to sell their vehicle or sell a remainder of a lease to a dealer. The dealers bid on a cash payout, the cash payout being the amount of funds in excess of the loan or lease payoff that is paid to the consumer for the trade-in. In certain embodiments, the consumer may acquire a vehicle using the transaction platform and the cash payout from the trade-in listing may be applied to any amounts due from the vehicle acquisition.

In certain embodiments, the transaction platform includes a trade-in recommendation engine configured to notify a consumer or a dealer of a potential trade-in transaction for one of the vehicles leased using the transaction platform. When a vehicle lease listed on the platform is completed by the consumer and dealer, the vehicle and transaction information is saved by the transaction platform. During the course of the lease, the transaction platform performs a valuation on the vehicle, determines whether the consumer has equity in the vehicle, and determines whether a dealer is willing to offer a vehicle lease of their current vehicle or a similar vehicle for a lower price given their current consumer profile. The transaction platform may contact the consumer or dealer about trading in the leased vehicle for a trade-in price. The trade-in transaction is completed when the consumer wins an auction within a given time period.

In certain embodiments, the consumer interface includes a page or a portion of an existing page configured to receive a vehicle request from a consumer. The car request may be used by the platform to notify a dealer of a vehicle that a consumer is looking to purchase. The request may be received by completing fields identifying the vehicle or by pushing a button on the user interface, to name but a few examples. In certain embodiments, the transaction platform may notify a dealer of the vehicle request. In certain embodiments, the transaction platform may automatically list the requested vehicle after determining a vehicle matching the parameters of the vehicle request is in the dealer inventory. For example, the transaction platform may notify a dealer a volume bonus discount is coming up and that a number of consumers in their locale have requested certain vehicles. The transaction platform may then automatically list those vehicles (possibly at a discount that the platform determines will create a certain percentage chance of a completed transaction within a certain period of time) and notify those consumers that those vehicles are live to help the dealer obtain their volume discount in time and help the consumer complete the transaction at a great price. In certain embodiments, the vehicle request may be used by the platform to notify dealers not currently using the platform in order to incentivize joining the transaction platform.

In certain embodiments, each consumer user interface is configured to display a simulation module, where consumers can compare what they would pay for a particular auction to have the winning bid compared to what the consumer would pay with a different consumer profile.

In certain embodiments, each consumer user interface is configured to display a leaderboard including a normalization toggle allowing the users to compare what another consumer paid and what they would pay. In this way, the consumer can understand the difference in price caused by the difference in consumer profiles, which may direct the consumers to add discounts to their consumer profile. In certain embodiments, the leaderboard information may be displayed on the auction page to show a consumer a point of comparison by displaying the highest-ranking leaderboard transaction specific to the vehicle.

Figure 11:
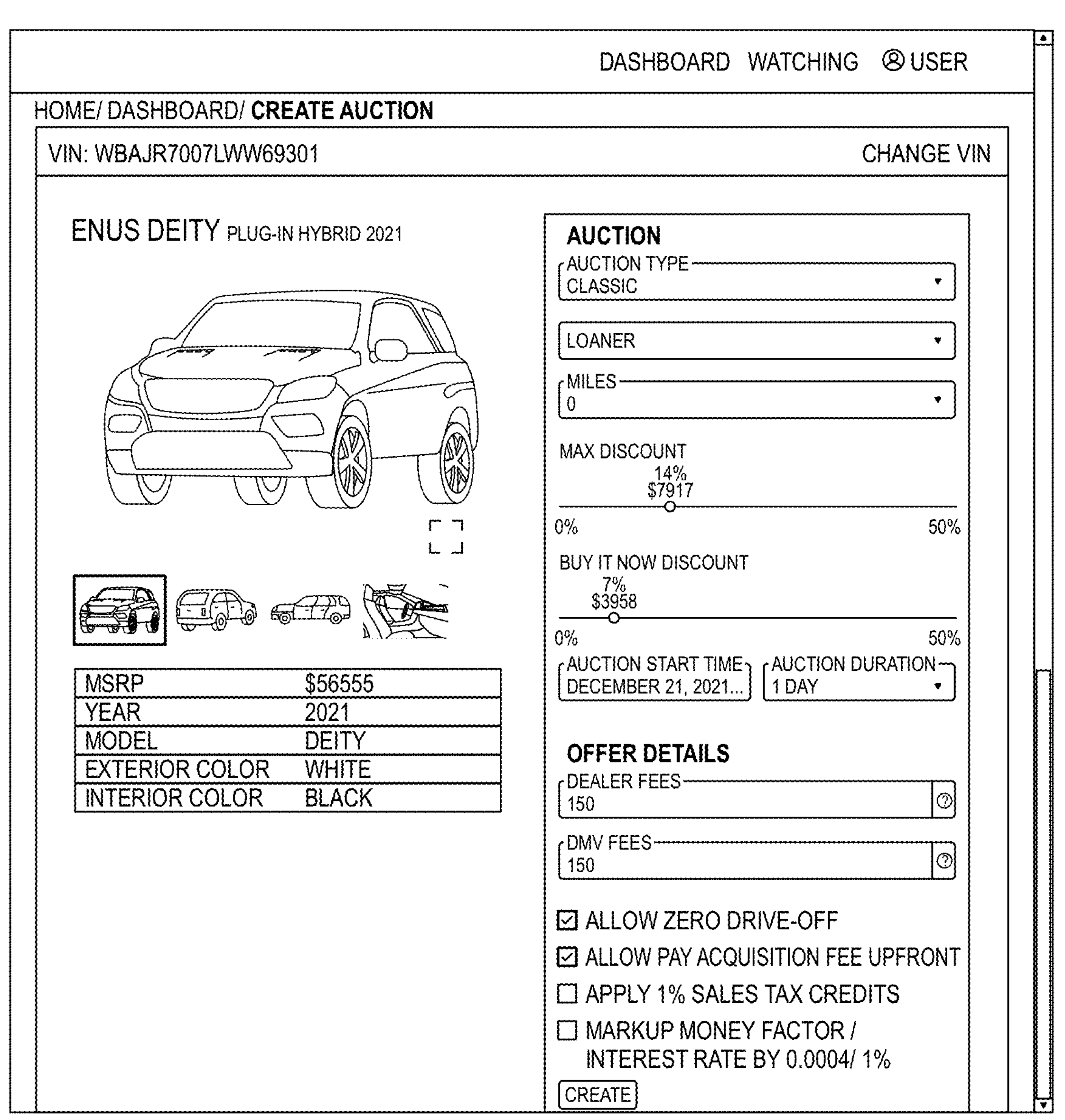

With reference to FIGS. 11-13, there is illustrated an exemplary listing page for a dealer-side transaction user interface. The listing page includes a plurality of fields to enter auction parameters including auction type, a maximum lease discount, a buy it now discount, an auction start time, an auction duration, and dealer fees. The listing page also includes sections that display information helpful to the dealer in setting the auction parameters, including a lease rate section having the money factors and residual values for each credit score tier, and a discount section having the amounts of each available discount for the vehicle to be listed.

In certain embodiments, a dealer may only allow consumers with a verification score above a threshold to bid. In certain embodiments, the dealer may offer a discount for consumers with a verification score above a threshold. This should result in a higher percentage of transactions being completed after the auction ends In certain embodiments, the transaction platform calculates and displays a certainty of sale parameter based on at least one of historical data, auction parameters entered on the dealer-side transaction user interface, and vehicle inventory. For example, in response to the dealer inputting the auction parameters, such as a percentage discount, using the dealer-side transaction user interface, the user interface may display the likelihood of a sale. For example, if the dealer specified a 10% discount on the lease, the transaction platform may determine a 99% chance of a sale based on historical auctions, while an 8% discount may only have a 60% chance of a sale. In certain embodiments, the chance of sale is based, at least in part, on a time window. The time window may be the length of the auction, or another length of time within the length of the auction. The dealer may specify the length of the time window. For example, the transaction platform may determine a 99% chance of sale within two weeks of listing the vehicle (which may be shorter than the duration of the auction, possibly using a buy it now feature). In certain embodiments, the dealer may enter a percent chance of sale and the transaction platform will, in response, determine the auction parameters.

In certain embodiments, where the transaction platform has received inventory data and sales target data from a dealer, the transaction platform automatically lists dealer inventory with auction parameters determined by the transaction platform to meet a sales target of the dealer while maximizing profit. For example, if the transaction platform determined a dealer is five cars away from meeting a sales target, the transaction platform may list five vehicles with a discount having a certainty of sale parameter of 99%. In certain embodiments, the transaction platform may suggest a listing strategy including auctioning one or more cars at certain percentage discounts instead of automatically listing. In certain embodiments, the transaction platform lists the vehicle in response to receiving an approval message from the dealer after the dealer receives the listing suggestion.

In certain embodiments, the dealer may use the user interface to indicate that only a subset of consumers may view and/or participate in the auction. For example, the dealer may restrict participation in the auction to verified consumers.

Figure 14:
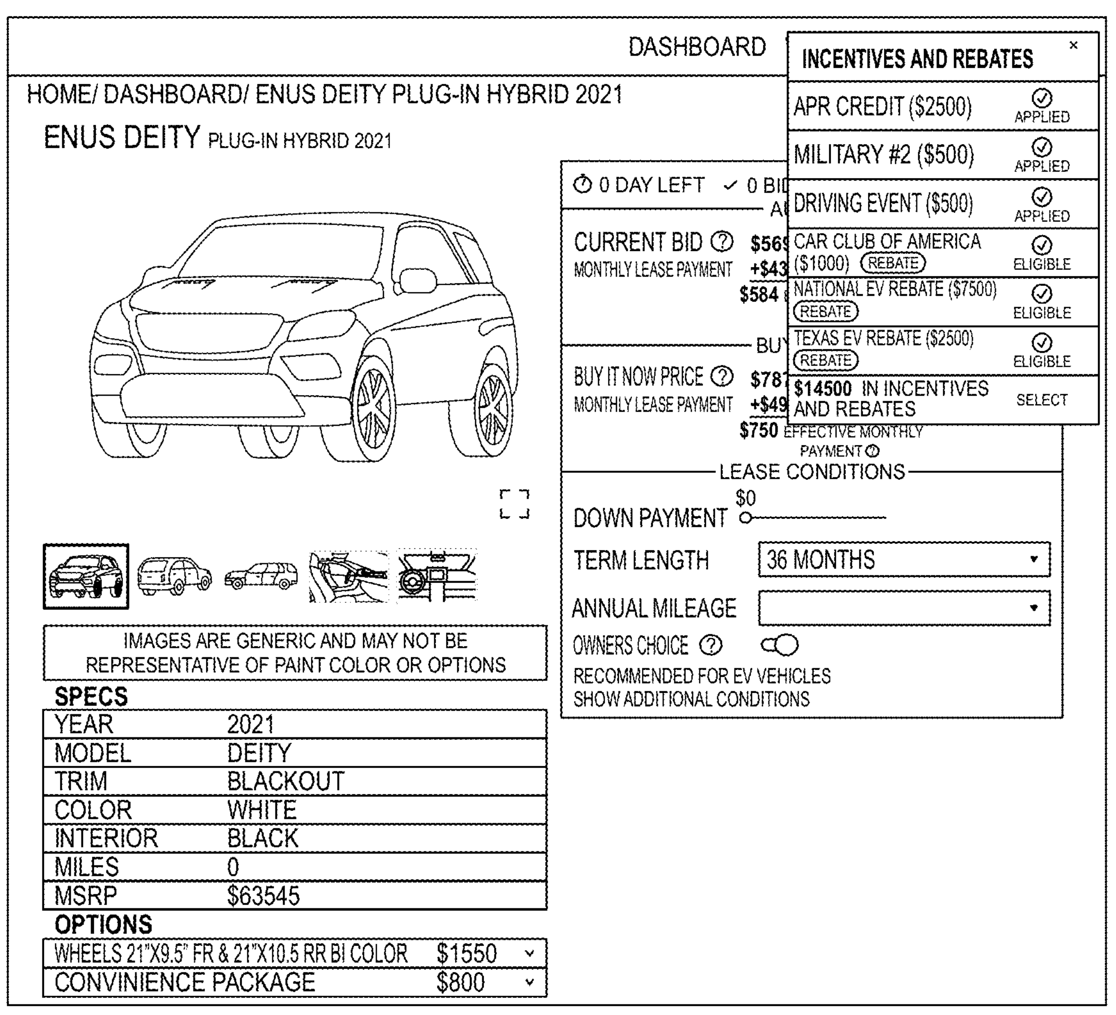
FIG. 14 illustrates an exemplary auction displayed on a consumer user interface.

With reference to FIG. 14, there is illustrated an exemplary auction page of a consumer user interface where the owner's choice option is selected. In some jurisdictions, leasing a vehicle rather than buying a vehicle disqualifies a consumer from receiving a type of discount on the transaction. By selecting the owner's choice option, the transaction is structured as a sale with an obligation for the dealer to purchase the vehicle at a future date in order to qualify for more discounts. As illustrated, selecting the owner's choice would structure the transaction in order to qualify for the national and Texas EV rebates.

Figure 15:
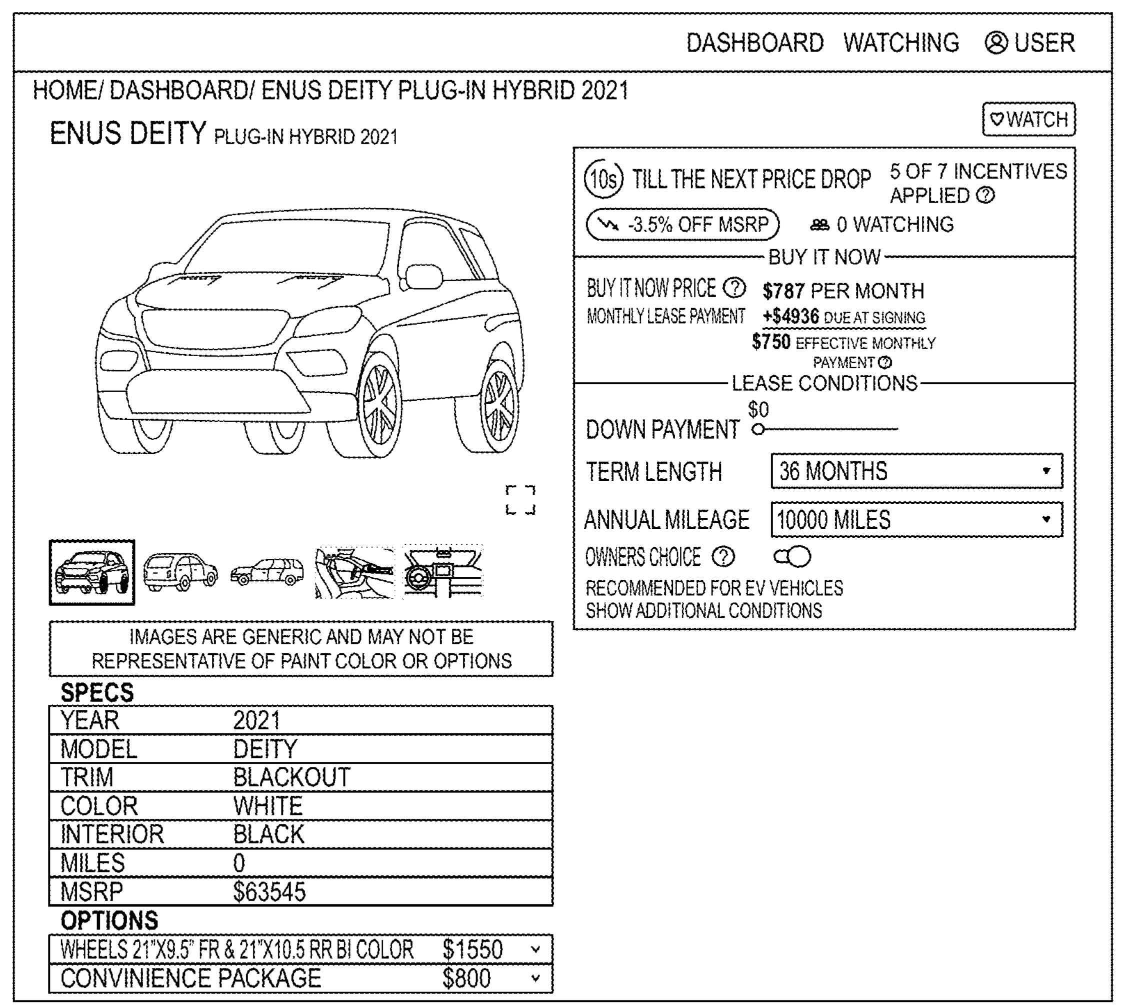
FIG. 15 illustrates an exemplary countdown auction displayed on a consumer user interface

With reference to FIG. 15, there is illustrated an exemplary countdown auction page of a consumer user interface. Instead of an auction where consumers outbid each other until one consumer with the highest bid wins the auction, the countdown auction displays a selling price that changes over time. The winner of the countdown auction is the first consumer to place a bid in the amount of the displayed minimum selling price. In certain embodiments, the selling price decreases over time. For example, the selling price may decrease linearly over time. In certain embodiments, the selling price may increase or decrease over time based one or more factors including consumer profile, the number of consumers viewing the auction, the number of consumers watching the auction, and the number of consumers bidding on the auction, to name but a few examples.

Figure 16:
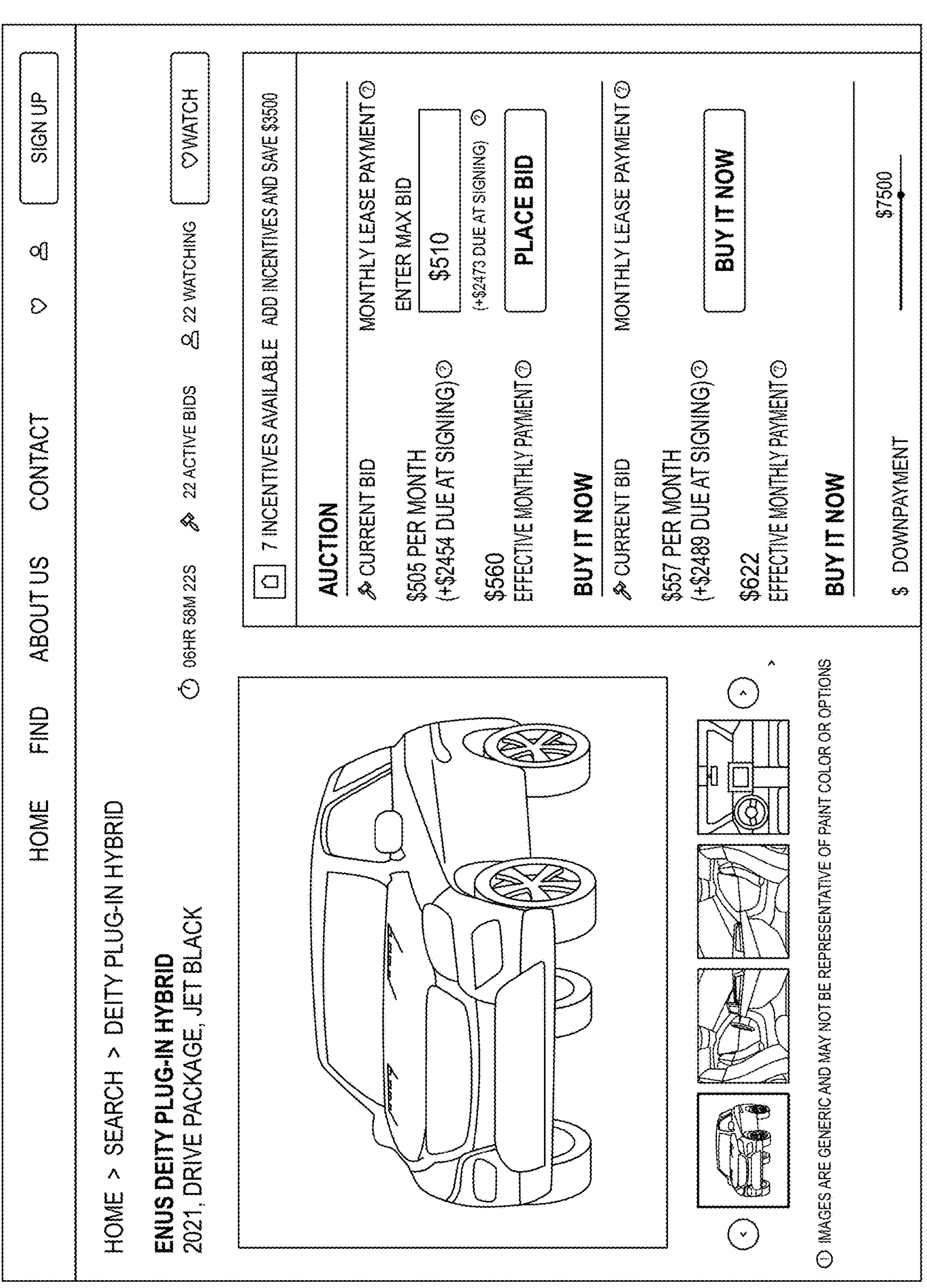
FIG. 16 illustrates an exemplary auction displayed on a consumer user interface.

With reference to FIG. 16, there is illustrated an exemplary auction page displayed by a consumer user interface. Like the other auction pages described herein, there is a visual representation of the auction item and a minimum selling price which is based on the consumer profile of the consumer viewing the auction page.

In embodiments, an auction (for example, an auction for a vehicle) and a corresponding auction database 124 may be initiated by a dealer using a dealer user interface 234 of a computing device 230. In embodiments, inventory data such as information about the vehicle for auction (e.g., a vehicle record) may be obtained by the transaction platform 100 from a dealer inventory database using API 130 to communicate with an API of the dealer inventory database (e.g., using an API 162, as described with reference to FIG. 1B). The auction database 124 may associate the vehicle with a listing identification (ID), and include the vehicle record including its VIN number, manufacturer, model, year, mileage, condition, visual representations (e.g., pictures), maintenance history, an underlying value of the vehicle (e.g., a market price such as the manufacturer suggested retail price), etc.

To reduce costs associated with and increase speed of obtaining the vehicle record (e.g., cost in time and money as well as compute and network resources), the online transaction platform 100 may store the vehicle record in a cache 150 of the online transaction platform 100 after obtaining it from the dealer inventory database.

Prior to the online transaction platform 100 permitting a user to participate in the auction, the user may need to complete a consumer profile, as discussed herein. In an example, the consumer profiles for users participating in the auction may be stored in a consumer profile database 122 and pulled by a computer system (e.g., web application 110 as embodied on the microservices) of the online transaction platform 100. Also, as described elsewhere herein, the consumer profiles may include information not entered by the user but obtained via a third-party API, such as a credit score. In some embodiments, the online transaction platform may obtain the user's credit score prior to allowing the user to participate in the auction. In some embodiments, the platform 100 may allow a dealer to toggle whether or not to allow only "credit verified" users to participate in an auction, such credit verified users having had their credit score obtained prior to participating in the auction.

Based on the consumer profile, the online transaction platform 100 may determine which incentives, rebates, and/or discounts (as described in further detail elsewhere herein) a user is eligible for with regard to the vehicle on auction. For example, the online transaction platform may use API 130 to query a third-party database (e.g., from an OEM, financial institution, or third-party aggregator) to confirm an amount of discount a user is eligible for based on their consumer profile. This determination may be made at the time the user sets up the consumer profile and the incentives, rebates, and discounts that a user is eligible for may be saved as part of the user's consumer profile in the consumer profile database 122, avoiding the need for further costly API calls. Eligible discounts for a particular auction may be determined in real time during the auction, based on changes to the user's consumer profile or the transaction terms selected by the user (e.g., lease term length, a down payment amount, or a mileage amount). In some embodiments, the user may select, via a user interface, the incentives, rebates, and/or discounts that he or she is eligible for at the time of creating their consumer profile, and these discounts may be stored as part of the user's consumer profile. For example, these incentives, rebates, and discounts may be selected from a global list comprising many OEMs, and which may include discounts based on manufacturer loyalty, military, college, graduate, first responder, etc. This global list may include vehicle-specific incentives and rebates, and OEM incentives and rebates.

Also, the online transaction platform 100 may use information from the user's consumer profile (e.g., credit score, credit score tier, income, and/or credit profile such as vehicle credit profile including vehicle loan histories) to obtain interest rates from different lenders for the user. In an example, the different lenders may be provided as a list of lenders used by an OEM. The online transaction platform 100 may use an API 130 to communicate with the different lenders (e.g., as operated on external devices 160) and obtain the loan offers including interest rate. In some embodiments, the online transaction platform may flag the user as unlikely to obtain a loan if, for example, the user's income is too low relative to a cost of a vehicle.

With reference to FIGS. 1B and 1C, in embodiments, an online transaction platform 100 may include a computer system (e.g., web application 110 as embodied on the microservices) and a consumer profile database 122 including a first consumer profile and a second consumer profile. The online transaction platform including the consumer profile database 122 and the computer system may include a microservice architecture including compute resources, network resources, database resources, and other services as described herein.

The computer system, which may include one or more computer devices 300 as part of the microservice architecture for web application 110, may be configured to access the consumer profile database 122 including the first consumer profile and the second consumer profile, to determine a first minimum bid for a leasehold transaction based on a seller proceeds value and the first consumer profile associated with a first consumer, and to determine a second minimum bid for the leasehold transaction based on the seller proceeds value and the second consumer profile associated with a second consumer.

Furthermore, in embodiments, and with reference to FIG. 17B, the computer system may cause to be displayed, on a first user interface (e.g., a web-based user interface 114 as provided by frontend application 112 on a computer device 210), a first visual representation 1710 of the leasehold transaction including the first minimum bid 1712. In some embodiments, the first minimum bid 1712 may correspond to a monthly payment amount, and the first visual representation 1710 of the leasehold transaction may include a plurality of transaction terms 1714. For example, the plurality of transaction terms 1714 may include at least one of a lease term length 1716, a down payment amount 1715, or a mileage amount 1717, which may each be displayed on the first user interface. Furthermore, the first minimum bid 1712 may be the monthly payment amount necessary for the first user to be the current highest bidder for an auction. The computer system may also cause to be displayed, on the first user interface, a visual representation of the vehicle 1720 as well as details of the vehicle record.

Additionally, with reference to FIG. 8, the computer system may cause to be displayed, on the first user interface, the various incentives, discounts, and rebates that the first user is eligible for in that particular auction. For example, if the first user has a manufacturer loyalty incentive for being an owner of a vehicle produced by that manufacturer, that incentive may be indicated and applied towards the minimum bid when the first user views an auction for a vehicle by that manufacturer. Furthermore, the computer system may cause to be displayed, on the first user interface, additional incentives, discounts, and rebates that the first user may be eligible for based on their consumer profile, but which they have not indicated as being eligible for based on selection from the global list. Through the first user interface, the first user may have the ability to select these additional incentives, discounts, and rebates.

In embodiments, the transaction platform 100 may store the seller proceeds value in the auction database 124 and/or in the cache 150. The seller proceeds value may correspond to an underlying value of the vehicle that the dealer auctioning the vehicle may receive in proceeds based on the current winning bid. The seller proceeds value may be the same for all bidding consumers and the dealer, and may serve as a "source of truth" when calculating minimum bids necessary for other consumers to be the highest bidder based on a first consumer's bid. For example, the computer system may calculate the seller proceeds value based on a monthly payment (e.g., in the form of the currently winning bid), transaction terms of the currently winning bid, discounts, incentives, rebates, other fees, aspects of and application of the user profile, etc., to thereby determine the underlying value (e.g., a proceeds value) of the currently winning bid to the dealer. Thus, for example, the computer system may receive a bid from the first user and calculate the new seller proceeds value using, e.g., the pricing engine 115 based on these factors.

In an example, the pricing engine 115 may be structured as a dedicated computer device 300 for computing pricing calculations. For example, a web browser associated with a user interface may calculate a preliminary value (e.g., an updated minimum bid) based on revised transaction terms or other settings, but the computer system may refer the calculation to the pricing engine 115 for a more precise calculation. Alternatively, the calculations may always be performed by the pricing engine 115, thereby avoiding a need to build proprietary information into a user's web browser.

The computer system may push an update to the user interfaces when the seller proceeds value changes. In an example, the computer system may either calculate the new minimum bids for each user using, e.g., the pricing engine 115 and pushing the new minimum bids to the respective users, or by pushing the updated seller proceeds value to each of the user interfaces (e.g., via their corresponding computer devices) for calculating the respective new minimum bids local to the user interface (e.g., in a web browser that displays the user interface). Calculating the new minimum bids may be based on the seller proceeds value, while taking into account the transaction terms of the different users, their user profiles, and respective discounts, incentives, rebates, other fees, etc.

Thus, the first minimum bid 1712 may be based on the seller proceeds value but may take into account the various incentives, rebates, and discounts that the first user is eligible for, as well as a plurality of transaction terms that, in some embodiments, may be selected by the first user. Additionally, the first minimum bid 1712 may also take into account a lowest loan rate received from the different lenders for the first user, or be otherwise based on an optimization of the loans offered by the different lenders in a manner that maximizes profit for the dealer while providing the best loan for the user. Furthermore, in some embodiments, the computer system may determine a different optimal lender when, for example, the bid rises or a different term is selected.

Likewise, with reference to FIG. 17A, the computer system may cause to be displayed, on a second user interface, a second visual representation 1730 of the leasehold transaction including the second minimum bid 1732 based on taking the same factors into account for the second user. For example, the second user may have a higher credit score, leading to a better loan offer, a different selected lease term, better incentives, etc. Therefore, in an example, the first minimum bid 1712 may be greater than the second minimum bid 1732.

In some embodiments, the computer system may include a first computing device 210 having the first user interface and operated by the first user, and a second computing device 220 having the second user interface and operated by the second user. Furthermore, as described elsewhere herein, the online transaction platform 100 and its features described herein may exist in a microservices architecture, and the databases 120 such as the consumer profile database 122 and auction database 124 may be included in a cloud server considered part of or separate from the microservices architecture.

In some embodiments, the computer system may be further configured to receive, using the first user interface, at least one of an updated lease term, an updated down payment amount, or an updated mileage amount. For example, as shown in the transaction terms 1714 visually illustrated in FIG. 17B, these settings may be changed by the first user via slider bars and/or drop down menus of the first user interface. Furthermore, the computer system may be configured to update the displayed first minimum bid necessary for the first user to be the current highest bidder in response to receiving the at least one of the updated lease term, the updated down payment amount, or the updated mileage amount. For example, this calculation may be performed local to a computer device 210 of the first user interface (e.g., in the web browser), or may be performed by a pricing engine 115 and provided to the first user interface. Thus, some embodiments may provide an improvement to graphical user interfaces and online transaction technology by the ease in which a user can modify settings and be informed nearly instantly of the bid that will make them the highest current bidder.

In some embodiments, the second visual representation of the leasehold transaction may include a second plurality of transaction terms 1734, where the second plurality of transaction terms 1734 may be different from the first plurality of transaction terms 1714.

In some embodiments, the first and second user interfaces may respectively permit the first and second users to input bids (for example, via a text box or any other manner of input). Also, in some embodiments, and in order to provide an improvement relating to the prevention of online fraud in the transaction system (such as shill bidding), the computer system may require the bidding user to enter credit card information prior to submitting the bid. In an example, the computer system may place a hold on the credit card in the amount of the bid, or in some fractional relation thereto. Likewise, in some embodiments, the computer system may be further configured to receive, using the second user interface, a consumer bid greater than or equal to the second minimum bid and less than the first minimum bid, to update the seller proceeds value in response to receiving the consumer bid as discussed herein, and to increase the first minimum bid in response to updating the seller proceeds value.

In some embodiments, the computer system may check for an updated seller proceeds value at regular time intervals (for example, at five-second or ten-second intervals), and push the updated seller proceeds value to the respective user interfaces for updating the respective minimum bids based on the updated seller proceeds value. The time interval may become shorter based on a popularity of the auction or as the auction nears its ending time, but to conserve compute and network resources, it may otherwise stay at the slower five- or ten-second interval.

In some embodiments, the computer system may be further configured to cause the first minimum bid 1712 to be displayed on the first user interface simultaneously with causing the second minimum bid 1732 to be displayed on the second user interface.

By taking into consideration a seller proceeds value and basing the different minimum bids for each user on this seller proceeds value, and displaying these minimum bids through the user interfaces along with the other information described herein, the online transaction system may provide improvements to the technical fields of online transaction platforms and graphical user interfaces by clearly indicating the minimum bid required to be the current winning bidder, as well as providing clear and readily available access and visual control of the factors (e.g., incentives, rebates, discounts, and transaction terms) that may alter this minimum bid.

In some embodiments, when a user updates one or more of the transaction terms or any item of their consumer profile, the computer system may calculate a new minimum bid based on this update and the seller transaction value. In an example, these calculations may be containerized to a frontend application of the online transaction system by being performed locally on a user's web browser (e.g., web browser application 212 or 222 of FIG. 2) or local computing device running the web browser. However, in other embodiments, this calculation (as well as other calculations and determinations herein) may be conducted by the pricing engine 115 of the online transaction platform 100.

In some embodiments, the second consumer profile may include a leasehold discount. For example, this leasehold discount may be determined based on the incentives, discounts, and rebates that the second user is eligible for. Furthermore, the computer system may be further configured to determine the second minimum bid for the leasehold transaction based on the leasehold discount.

With reference to FIG. 17C, in some embodiments, the computer system may be further configured to cause to be displayed, on a seller interface, a third visual representation 1750 of the leasehold transaction including the seller proceeds value 1752, and to update the seller proceeds value in response to receiving a consumer bid from the second user interface. For example, the seller interface may be a user interface provided to the dealer on a computer device 230. The updated seller proceeds value may not be equal to the consumer bid, and the seller proceeds value may not be equal to the second minimum bid.

In some embodiments, the dealer may control the online transaction platform (e.g., through a dealer user interface 234) to automatically drop the price such as a minimum starting bid (or, e.g., instant buying price) or a minimum reserve bid based on an amount of time without any bids in the auction, such as an amount of time left in the auction, or an amount of time that the vehicle has been on auction. Such price adjustments may also be based on interest in the auction—for example, a number of recent views or watchers of the auction. In some embodiments, the online transaction platform may utilize machine learning and/or artificial intelligence to determine the optimum time to drop the price for a given auction based on the factors discussed above. In other embodiments, the dealer may be able to set a curve that defines a drop in price over the course of the auction (e.g., over the course of seven days for a seven-day auction). In an example, the computer system may default to a price drop that is dramatic at first but continues to drop at a slower rate as the auction nears its end without any bids. Also, in some embodiments, the computer system may send a push notification to the user web browsers to update the price such as the minimum starting bid.

As described above, in some embodiments, the seller proceeds value may correspond to a proceeds amount to be generated whether the leasehold transaction is executed using the first minimum bid or the second minimum bid.

In some embodiments, the seller proceeds value may correspond to a discount amount, whether the leasehold transaction is executed using the first minimum bid or the second minimum bid.

In some embodiments, the computer system may be further configured to receive a consumer bid using the first user interface, update the seller proceeds value in response to receiving the consumer bid, determine an updated financial parameter in response to the updated seller proceeds value and the second consumer profile, and update the second minimum bid based on the updated financial parameter. For example, the computer system may determine (e.g., based on information from the lenders stored in cache 150) that a different lender may provide a better rate for the user based on the amount they will be paying, and update the financial parameter including the loan based on this determination.

In some embodiments, when a user has won the auction, the computer system may provide the winning user and the dealer with the details of the transaction, such as containing the relevant information discussed herein, through the respective user interfaces, email, SMS text messages, and/or any other method. In an example, the computer system may provide only generic information to the dealer regarding the winning user, thereby avoiding the disclosure of personally identifiable information (PII) and allowing the dealer to accept or reject the deal based on the underlying attributes of the auction winner without other bias. The computer system may also send the details of the deal (e.g., in a deal "wrapper") to desking software of a third party provider (e.g., via an API call to an external device 160) to finalize the transaction.

In some embodiments, the computer system may alert auction users and dealers via email and/or SMS texts regarding new bids, updated minimum bids, winning or losing an auction, recommendations of similar items (e.g., vehicles), etc.

Figure 18A:
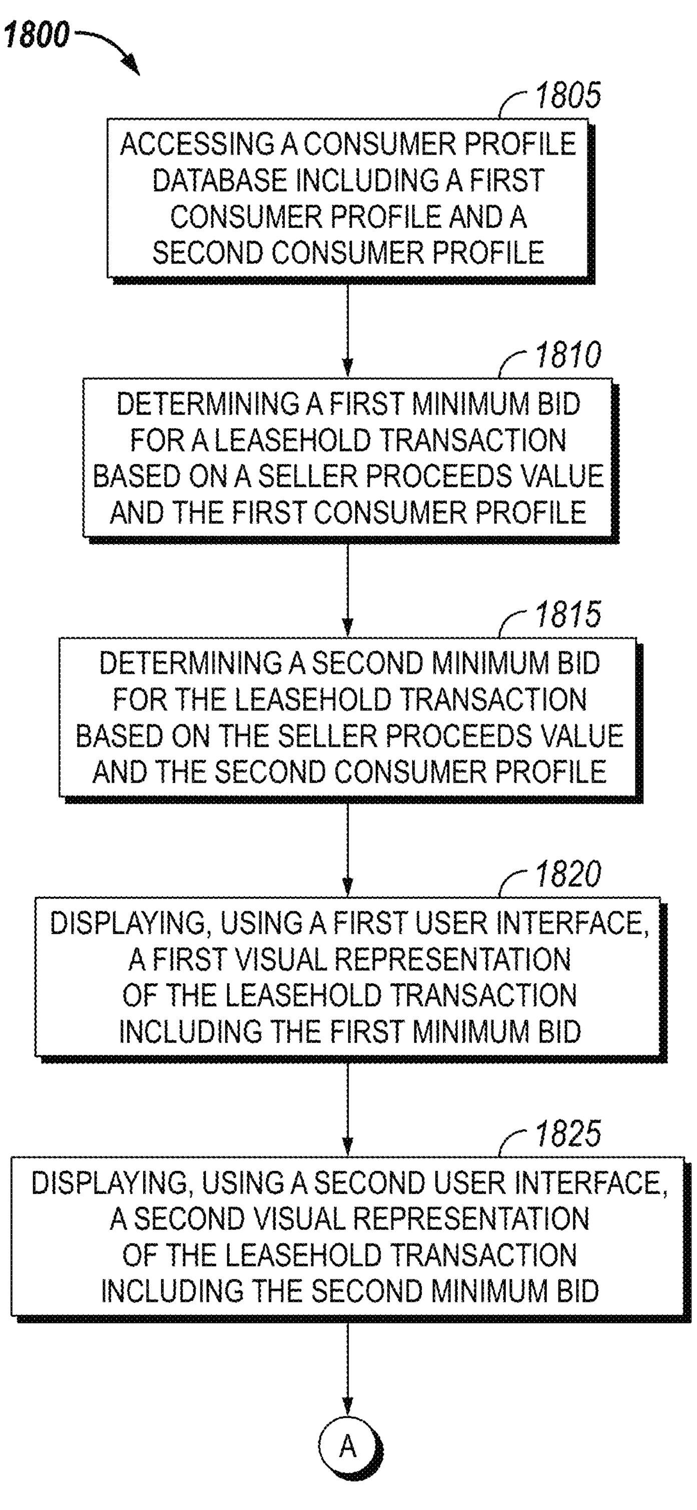
FIGS. 18A-18E illustrate a method for operating on an online leasehold transaction platform.

With reference to FIG. 18A, in embodiments, a method 1800 for operating on an online leasehold transaction platform includes accessing 1805 a consumer profile database including a first consumer profile associated with a first consumer and a second consumer profile associated with a second consumer; determining 1810 a first minimum bid for a leasehold transaction based on a seller proceeds value and the first consumer profile associated with the first consumer; determining 1815 a second minimum bid for the leasehold transaction based on the seller proceeds value and the second consumer profile associated with the second consumer; displaying 1820, using a first user interface, a first visual representation of the leasehold transaction including the first minimum bid; and displaying 1825, using a second user interface, a second visual representation of the leasehold transaction including the second minimum bid. The first minimum bid may be greater than the second minimum bid.

In some embodiments, the first minimum bid may correspond to a monthly payment amount, and the first visual representation of the leasehold transaction may include a plurality of transaction terms.

In some embodiments, the plurality of transaction terms includes at least one of: a lease term length, a down payment amount, or a mileage amount.

Figures 18B, 18C, 18D, 18E:
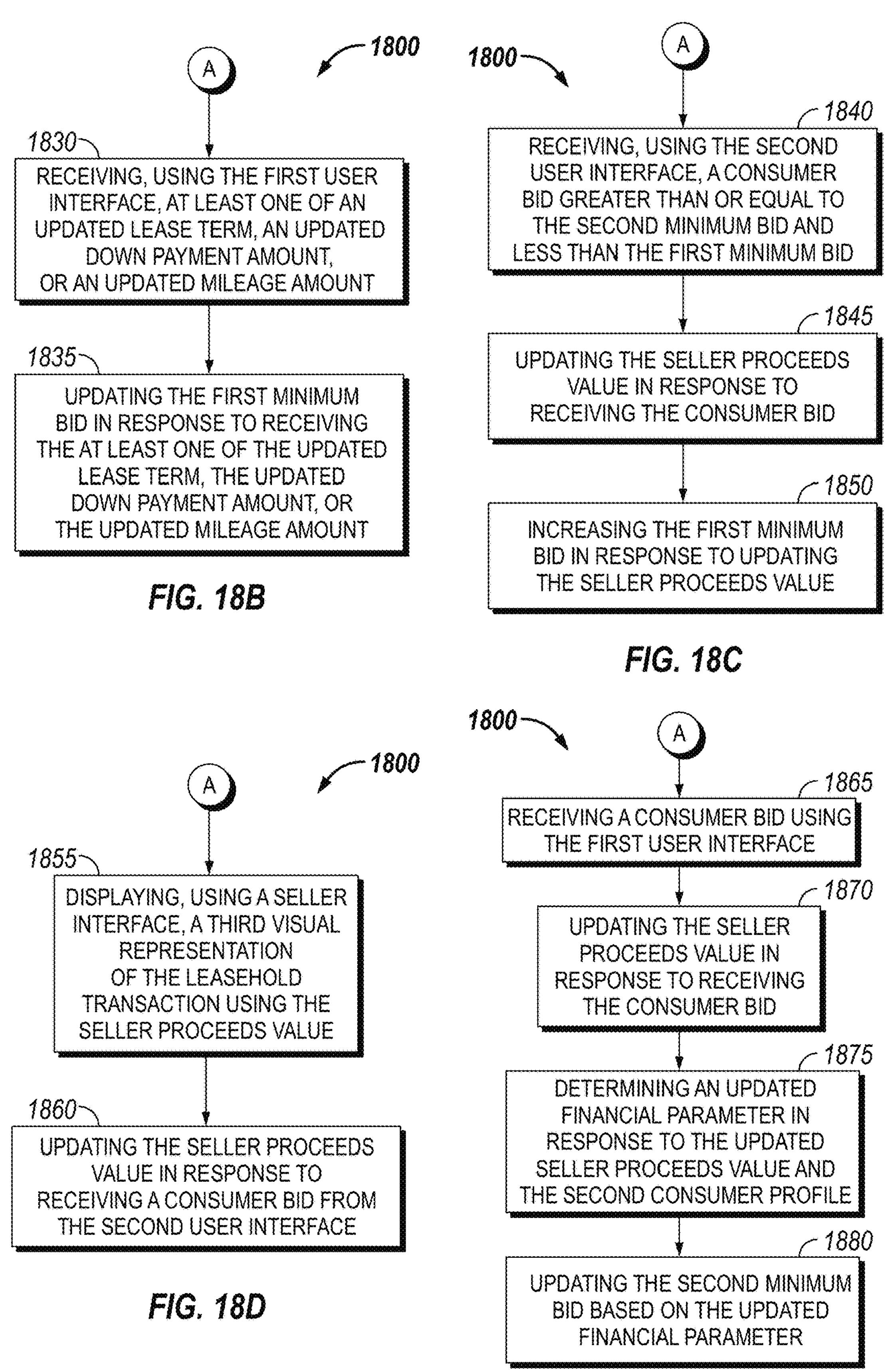

With reference to FIG. 18B, in some embodiments, the method may further include receiving 1830, using the first user interface, at least one of an updated lease term, an updated down payment amount, or an updated mileage amount; and updating 1835 the first minimum bid in response to receiving the at least one of the updated lease term, the updated down payment amount, or the updated mileage amount.

In some embodiments, the second visual representation of the leasehold transaction may include a second plurality of transaction terms, where the second plurality of transaction terms may be different from the first plurality of transaction terms.

With reference to FIG. 18C, in some embodiments, the method may further include receiving 1840, using the second user interface, a consumer bid greater than or equal to the second minimum bid and less than the first minimum bid; updating 1845 the seller proceeds value in response to receiving the consumer bid; and increasing 1850 the first minimum bid in response to updating the seller proceeds value.

In some embodiments, displaying the first minimum bid using the first user interface may occur simultaneously with displaying the second minimum bid using the second user interface.

In some embodiments, the second consumer profile may include a leasehold discount, and the determining the second minimum bid for the leasehold transaction may be further based on the leasehold discount.

With reference to FIG. 18D, in some embodiments, the method may further include displaying 1855, using a seller interface, a third visual representation of the leasehold transaction including the seller proceeds value; and updating 1860 the seller proceeds value in response to receiving a consumer bid from the second user interface. The updated seller proceeds value may not be equal to the consumer bid, and the seller proceeds value may not be equal to the second minimum bid.

In some embodiments, the seller proceeds value may correspond to a proceeds amount to be generated whether the leasehold transaction is executed using the first minimum bid or the second minimum bid.

In some embodiments, the seller proceeds value may correspond to a discount amount whether the leasehold transaction is executed using the first minimum bid or the second minimum bid.

With reference to FIG. 18E, in some embodiments, the method may further include receiving 1865 a consumer bid using the first user interface; updating 1870 the seller proceeds value in response to receiving the consumer bid; determining 1875 an updated financial parameter in response to the updated seller proceeds value and the second consumer profile; and updating 1880 the second minimum bid based on the updated financial parameter.

While the above online transaction platform was described with regard to auctioning a vehicle, embodiments are not limited thereto, and such an online transaction platform may be applied to various sorts of personal or real property. Furthermore, the online transaction platform may be embodied in a manner that allows customers to self-host a containerized version of the online transaction platform.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions, and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions, or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client, and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of a program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code, and/or instructions. A central repository may provide program instructions to be executed on different devices. In this implementation, the remote repository may act as a storage medium for program code, instructions, and programs.

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuit, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit ("IC"), such as a logic IC, memory chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be configured for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented on a cellular network having multiple cells. The cellular network may either be frequency division multiple access ("FDMA") network or code division multiple access ("CDMA") network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory ("RAM"); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the Figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred"

utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A method for operating an online leasehold transaction platform, comprising:

displaying, using a first user interface, at least one intake page for a first consumer to indicate first consumer data;

generating a first consumer profile from the first consumer data;

receiving, using the first user interface, input search parameters from the first consumer;

displaying, using the first user interface, results including a plurality of vehicle leases for auction based on the input search parameters and the first consumer profile;

receiving, using the first user interface, at least one selection of one of the plurality of vehicle leases for auction;

receiving a seller proceeds value from a cache; and displaying, using the first user interface, a vehicle lease auction page, the vehicle lease auction page including:

a visual representation of a corresponding vehicle;

a first minimum selling price; and a plurality of fields for inputting a bid and at least one lease term, wherein the first minimum selling price is based on the seller proceeds value and the first consumer profile, and the first minimum selling price is different from a second minimum selling price that is based on the same seller proceeds value and a second consumer profile.

2. The method of claim 1, further comprising:

calculating the first minimum selling price by at least one computer system local to the first user interface based on the seller proceeds value, the first consumer value, and the at least one lease term.

3. The method of claim 1, further comprising:

receiving an indication of a changed seller proceeds value;

calculating, by at least one computer system local to the first user interface, a new first minimum selling price for the vehicle lease auction page based on the changed seller proceeds value; and displaying, using the first user interface, the vehicle lease auction page including the new first minimum selling price for the vehicle lease auction page.

4. The method of claim 1, wherein the minimum selling price includes a monthly loan payment amount and a down payment amount.

5. The method of claim 1, wherein the at least one lease term includes at least one of a monthly payment amount field, a down payment amount field, a lease term length field, or an annual maximum mileage field.

6. The method of claim 1, further comprising:

restricting the displayed results based on the first consumer profile and consumer characteristics specified by a dealer.

7. The method of claim 1, wherein the first consumer profile includes one or more discounts for which the first consumer qualifies, and the method further comprises indicating at least one of the plurality of vehicle leases is a good transaction based on the first consumer qualifying for a maximum number of the one or more discounts for the at least one of the plurality of vehicle leases.

8. The method of claim 1, wherein:

the first consumer profile includes at least one of a first consumer credit score, a first consumer credit score range, a first consumer age, a first consumer income, or a first consumer income range;

the first consumer data includes at least one of a zip code, phone number, name, annual income, credit score tier, email address, or discounts for which the first consumer is qualified to receive on a vehicle lease; and the input search parameters include at least one of an auction status, a vehicle condition, an auction type, a price range, a vehicle make, a vehicle model, or a budget.

9. A non-transitory computer-readable storage medium storing instructions that, when executed by at least one processor, comprise:

displaying, using a first user interface, at least one intake page for a first consumer to indicate first consumer data;

generating a first consumer profile from the first consumer data;

receiving, using the first user interface, input search parameters from the first consumer;

displaying, using the first user interface, results including a plurality of vehicle leases for auction based on the input search parameters and the first consumer profile;

receiving, using the first user interface, at least one selection of one of the plurality of vehicle leases for auction;

receiving a seller proceeds value from a cache; and displaying, using the first user interface, a vehicle lease auction page, the vehicle lease auction page including:

a visual representation of a corresponding vehicle;

a first minimum selling price; and a plurality of fields for inputting a bid and at least one lease term, wherein the first minimum selling price is based on the seller proceeds value and the first consumer profile, and the first minimum selling price is different from a second minimum selling price that is based on the same seller proceeds value and a second consumer profile.

10. The non-transitory computer-readable storage medium of claim 9, the instructions, when executed by the at least one processor, further comprising:

calculating the first minimum selling price by at least one computer system local to the first user interface based on the seller proceeds value, the first consumer value, and the at least one lease term.

11. The non-transitory computer-readable storage medium of claim 9, wherein the minimum selling price includes a monthly loan payment amount and a down payment amount.

12. The non-transitory computer-readable storage medium of claim 9, wherein:

the first consumer profile includes at least one of a first consumer credit score, a first consumer credit score range, a first consumer age, a first consumer income, or a first consumer income range;

the first consumer data includes at least one of a zip code, phone number, name, annual income, credit score tier, email address, or discounts for which the first consumer is qualified to receive on a vehicle lease; and the input search parameters include at least one of an auction status, a vehicle condition, an auction type, a price range, a vehicle make, a vehicle model, or a budget.

* * * * *